June 4, 1929.      P. J. CLIFFORD      1,716,208
AUTOMATIC TRAIN CONTROL APPARATUS
Original Filed Oct. 22, 1923     12 Sheets-Sheet 1
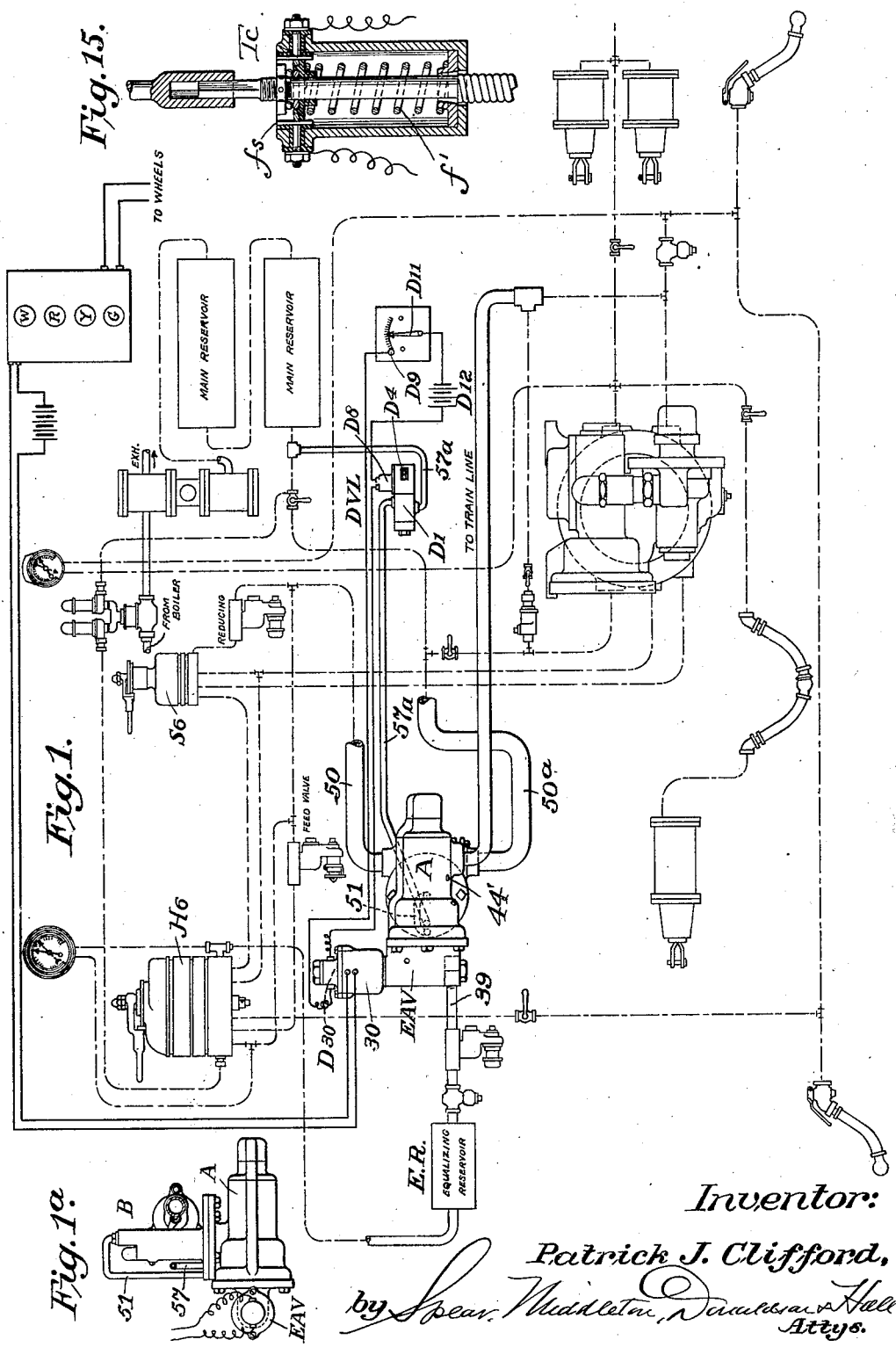
Inventor:
Patrick J. Clifford,
by Spear, Middleton, ... & Hall
Attys.

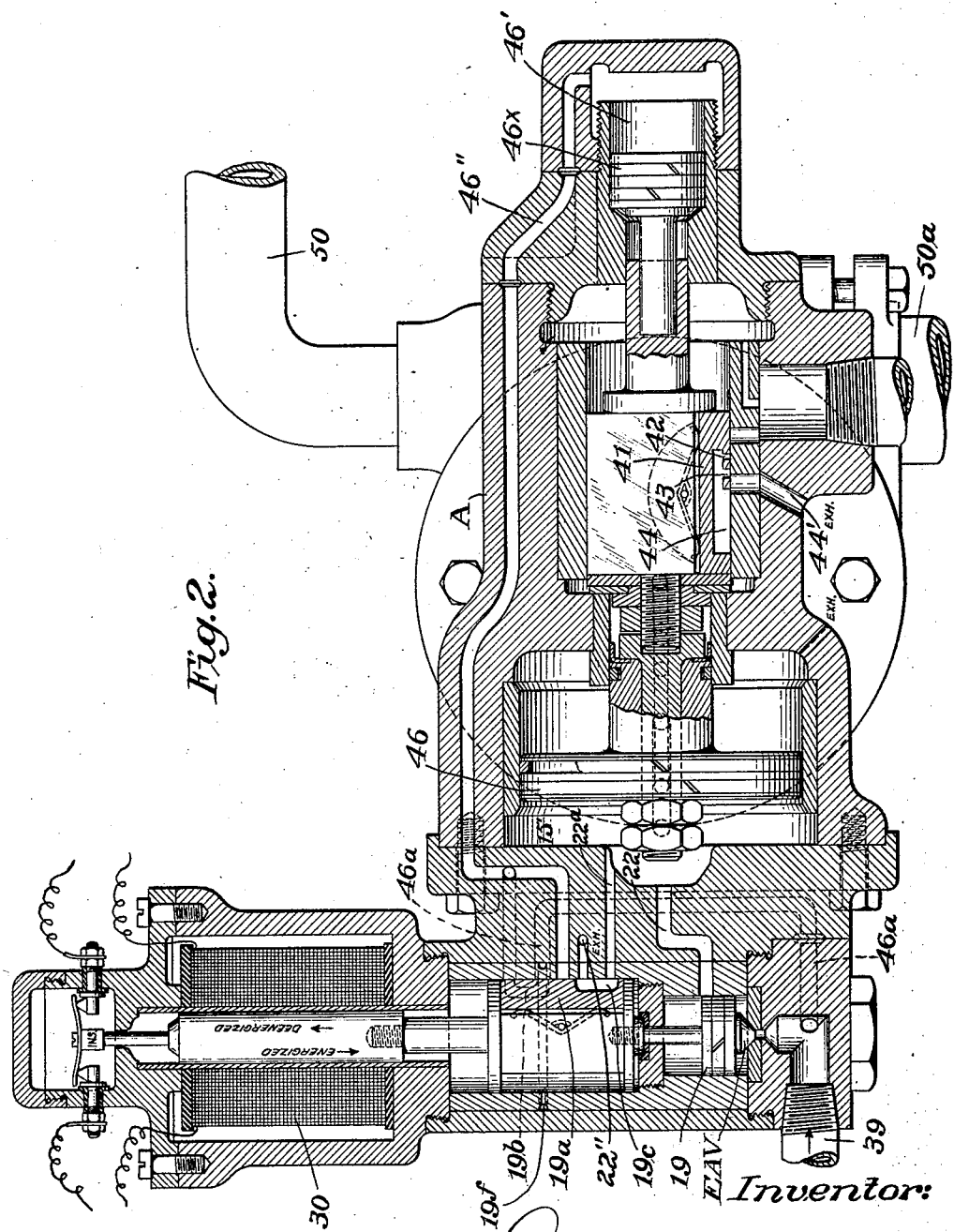

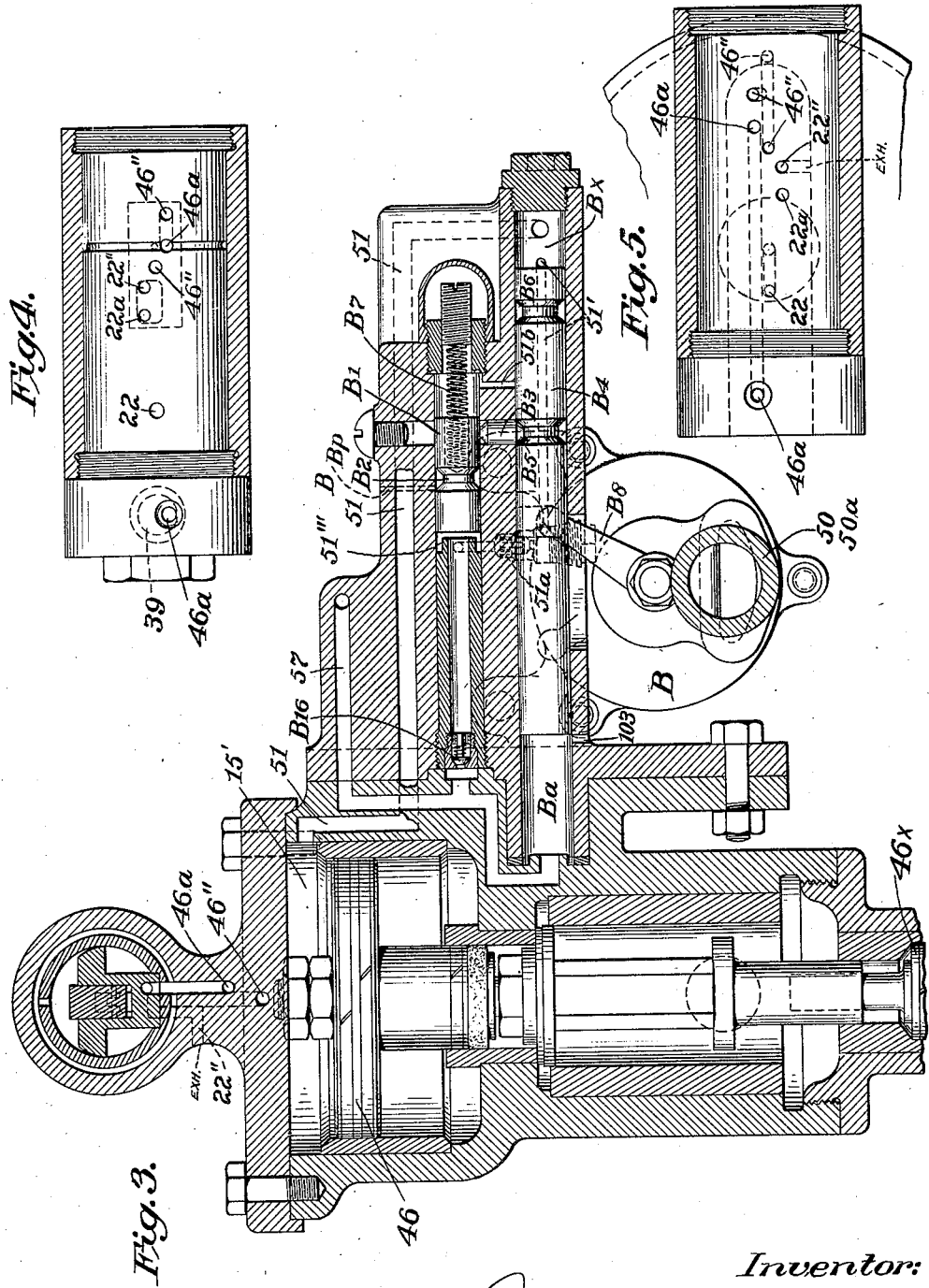

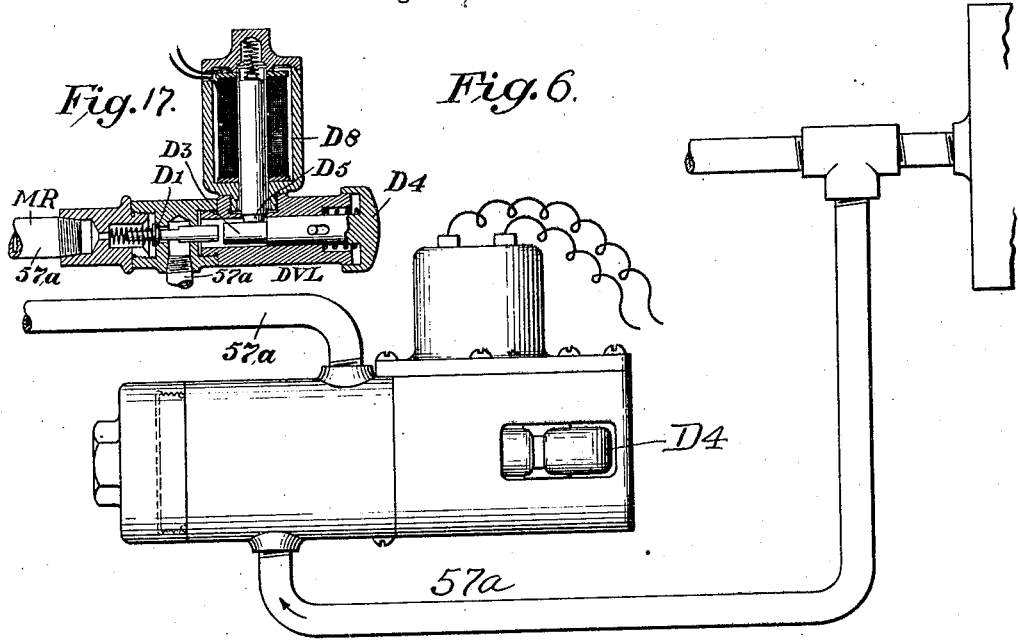
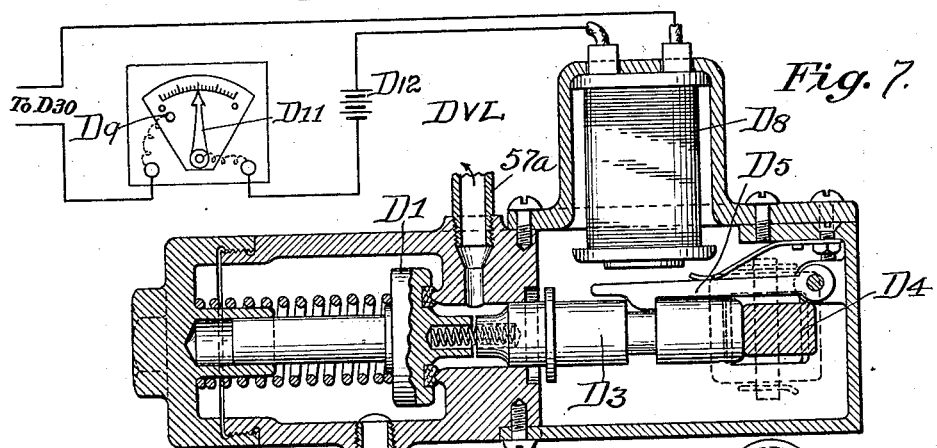
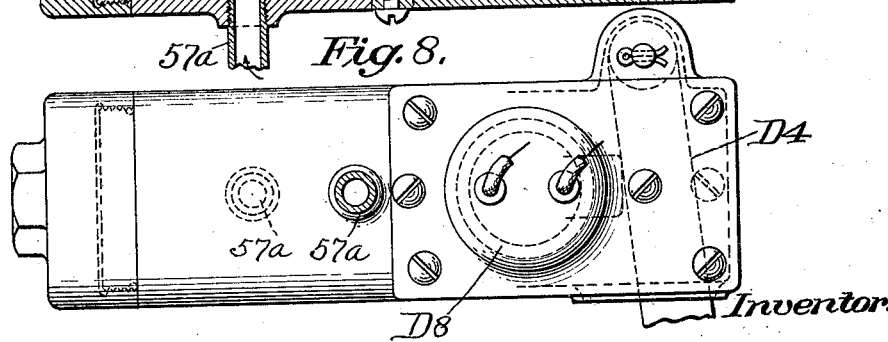

June 4, 1929.   P. J. CLIFFORD   1,716,208
AUTOMATIC TRAIN CONTROL APPARATUS
Original Filed Oct. 22, 1923   12 Sheets-Sheet 5

Inventor:
Patrick J. Clifford,
by Spear, Middleton, Donaldson & Hall
Attys.

June 4, 1929.   P. J. CLIFFORD   1,716,208
AUTOMATIC TRAIN CONTROL APPARATUS
Original Filed Oct. 22, 1923   12 Sheets-Sheet 7

HIGH SPEED — CAUTION BLOCK.

BELOW 35 M.P.H. — CAUTION BLOCK.

Inventor:
Patrick J. Clifford,
by Spear, Middleton, Donaldson & Hall
Attys.

June 4, 1929.  P. J. CLIFFORD  1,716,208
AUTOMATIC TRAIN CONTROL APPARATUS
Original Filed Oct. 22, 1923  12 Sheets-Sheet 8
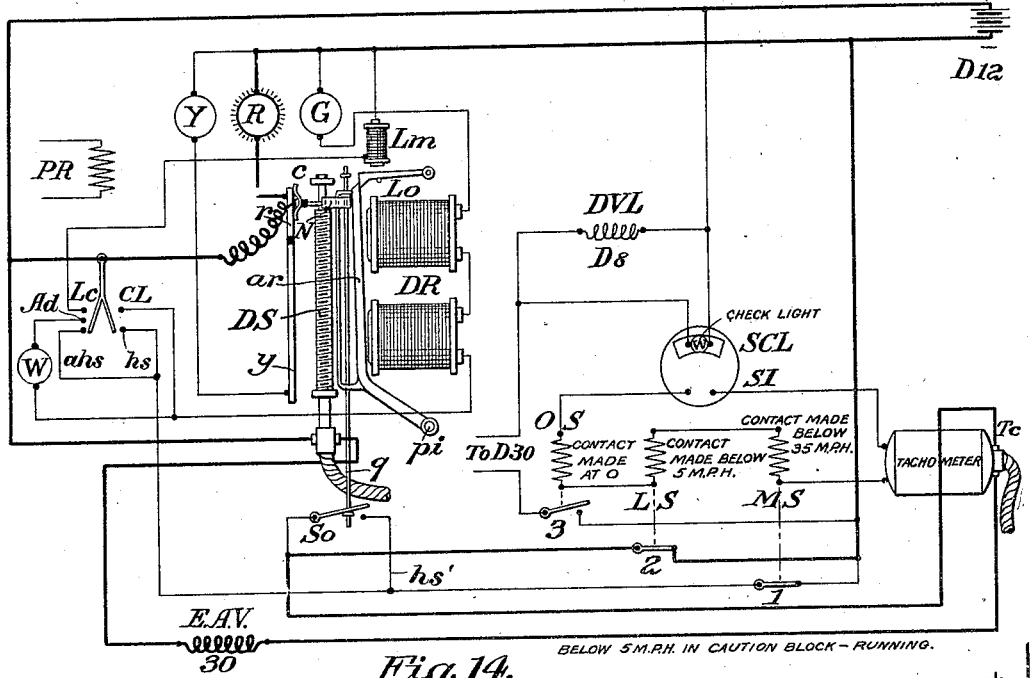
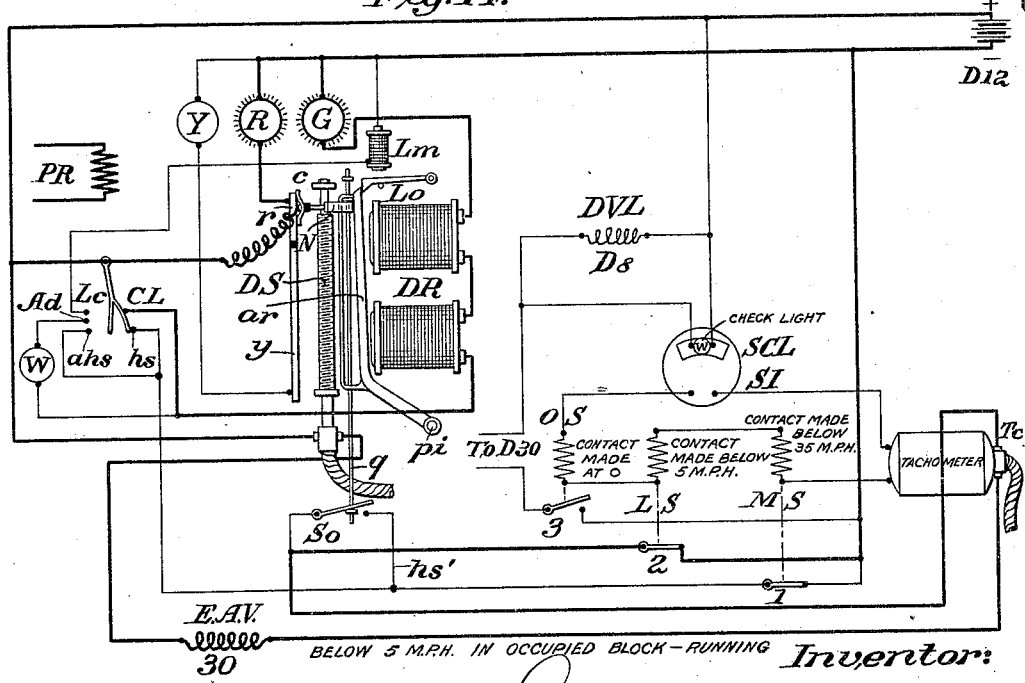
Inventor:
Patrick J. Clifford,
by Spear, Middleton, Donaldson & Hall
Attys.

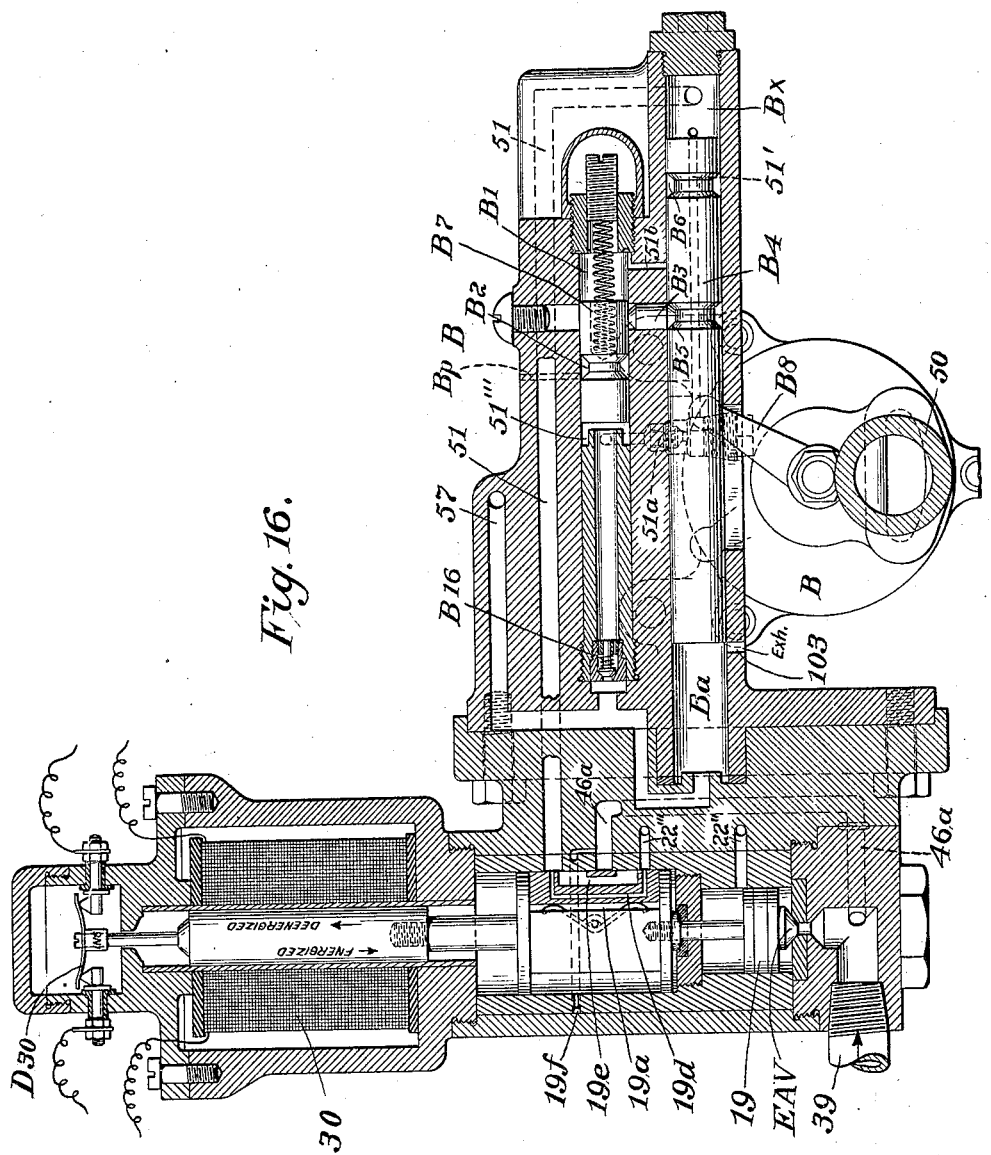

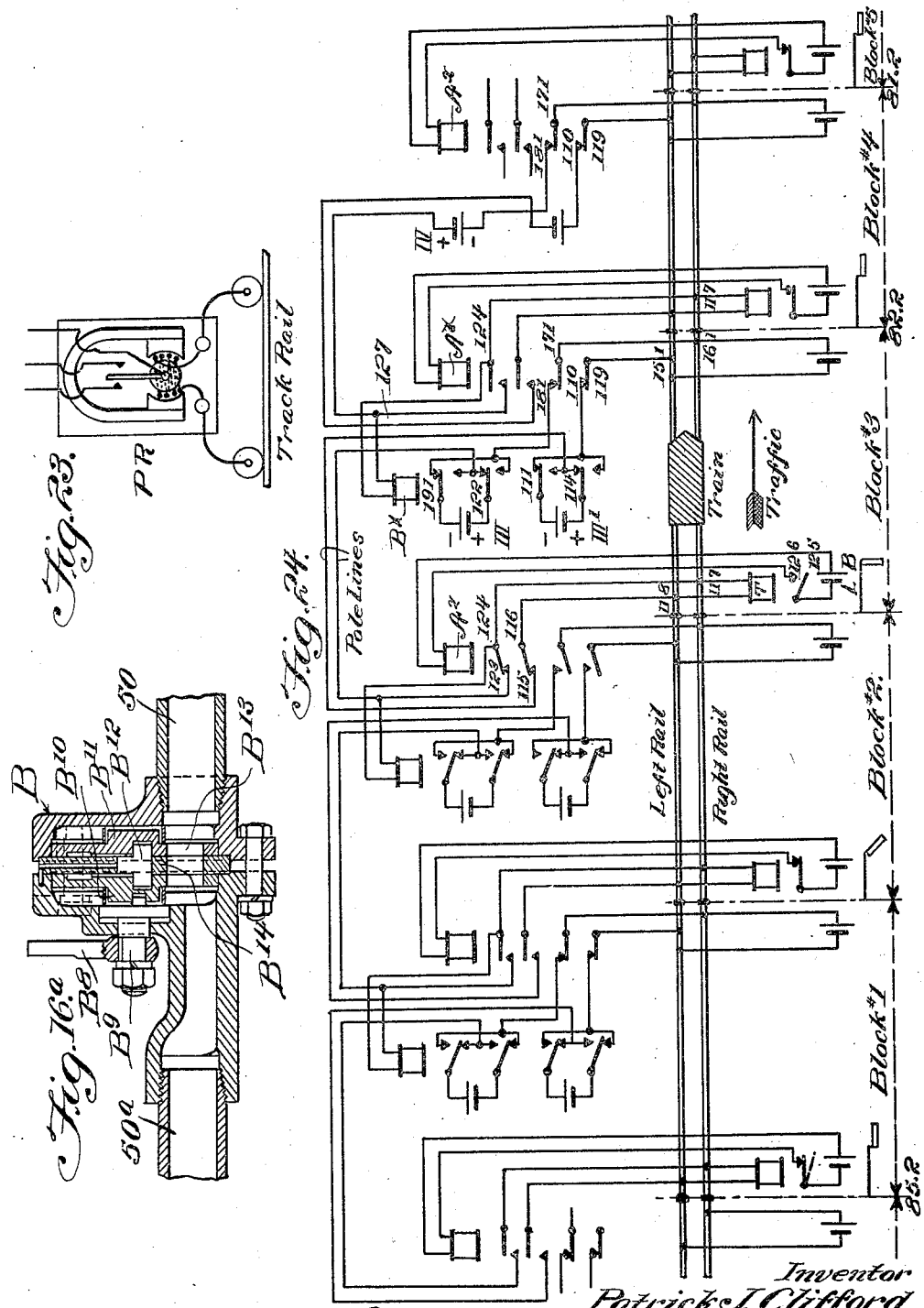

June 4, 1929.  P. J. CLIFFORD  1,716,208
AUTOMATIC TRAIN CONTROL APPARATUS
Original Filed Oct. 22, 1923   12 Sheets-Sheet 11

Inventor:
Patrick J. Clifford,
by Spear Middleton, Donaldson Hull
Attys.

June 4, 1929.  P. J. CLIFFORD  1,716,208
AUTOMATIC TRAIN CONTROL APPARATUS
Original Filed Oct. 22, 1923   12 Sheets-Sheet 12

Inventor
Patrick J. Clifford
By Spear, Middleton, Donaldson & Hall
Attorney

Patented June 4, 1929.

1,716,208

UNITED STATES PATENT OFFICE.

PATRICK J. CLIFFORD, OF FALLS, PENNSYLVANIA, ASSIGNOR TO TRAIN CONTROL CORPORATION OF AMERICA, OF NEW YORK, N. Y., A CORPORATION OF DELAWARE.

AUTOMATIC TRAIN-CONTROL APPARATUS.

Application filed October 22, 1923, Serial No. 670,123. Renewed January 12, 1928.

One object of the invention is to provide an automatic train control system which operates to insure safety of the train when prescribed advance conditions exist.

Figures 1 to 5 of the accompanying diagrams show the air system installed on the engine, and the new valves belonging to that system.

Figs. 6, 7 and 8 relate to the means for preventing the engineer's disabling valve from being operated back to normal position until the train has stopped, and for convenience I have styled this a disabling valve lock DVL.

Figs. 9 to 14 show the electric relay system, distance control relay, and wiring on the engine, these diagrams illustrating the system under different traffic conditions and different speeds of travel. The live circuits in each diagram are indicated by the heavy lines, except the circuit, which is energized by the tachometer and includes the three-speed relays.

Fig. 15 shows a circuit breaker to secure an automatic brake application if the shaft of the tachometer breaks.

Fig. 16 is a modified form of valve mechanism.

Fig. 16$^a$ is a sectional view taken vertically through the shaft of arm B$^8$ of Fig. 16 showing details relating to the engineer's disabling valve.

Fig. 17 is a view of a modified form of disabling valve lock.

Figure 18:
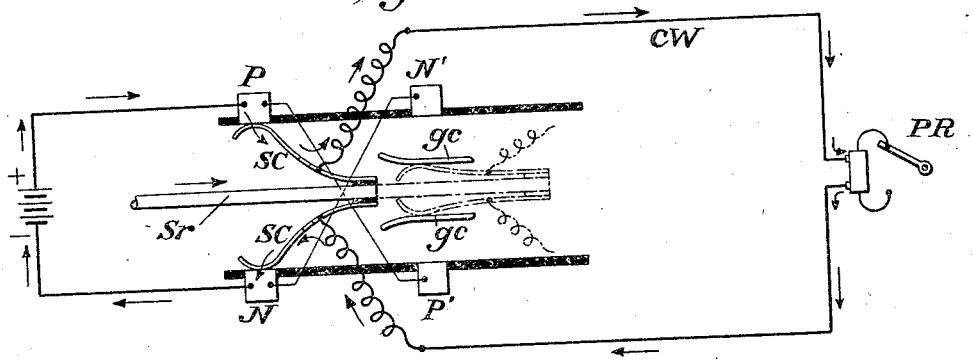
Figure 19:
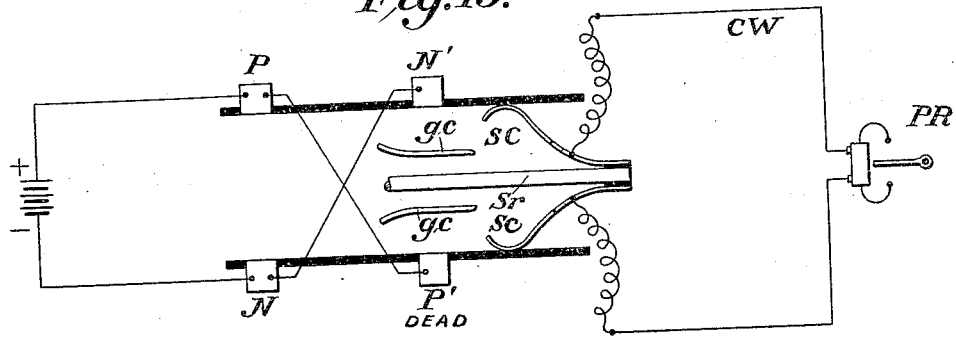
Figure 20:
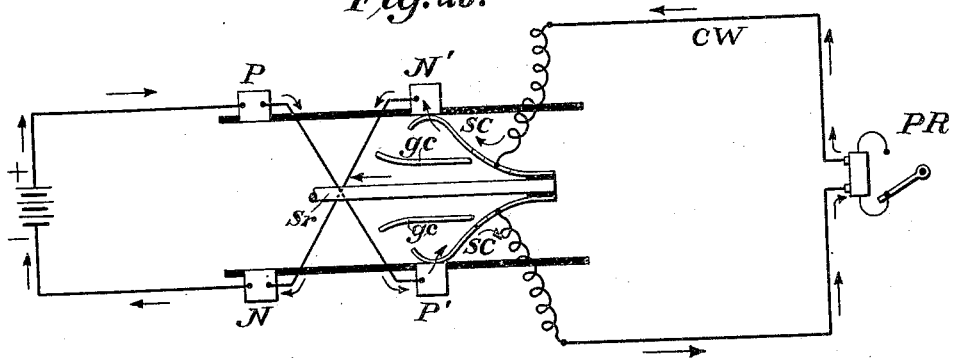

Figs. 18, 19 and 20 are diagrams of a mechanism for taking care of conditions arising from open track switches.

Figure 21:
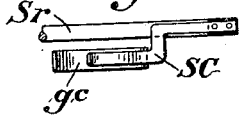

Fig. 21 is a detail.

Figure 22:
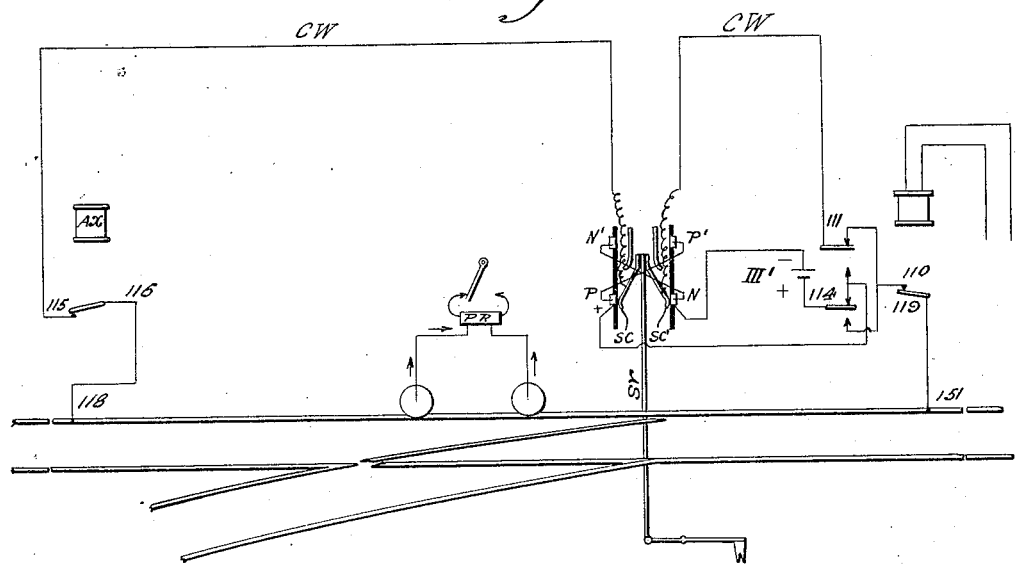

Fig. 22 shows the parts of Figs. 18 to 20 in the track circuit.

Fig. 23 is a diagrammatic view of the primary relay PR which is mounted on the vehicle.

Fig. 24 is a diagrammatic view of the track circuits.

One object of the valve organization herein described is to simplify the construction, do away with the so called trigger valve used heretofore in the Clifford system, and to operate the valve members by air pressure in both directions, thus avoiding the use of springs.

The valve mechanism may be assembled in one unit to economize space.

The automatic air release valve which releases air from the train pipe is shown generally at A, Fig. 2. It has a slide valve 41 controlling graduated ports 42, 43, 44, for the exhaust of train line air through the exhaust port 44' to atmosphere. It has a piston 46 which receives air through a port 22 to gradually move the valve towards the right to open the exhaust port 44', and it has a piston 46$^x$ which receives air pressure in the chamber 46' through a port 46" by which this valve is automatically restored to closed position, and without the use of a spring. The supply of operative air to the piston 46 of valve organization A is controlled by a valve EAV which normally closes a small port to which equalizing reservoir air pressure is led through a pipe 39. This EAV valve closes against this pressure and the port is comparatively small, so that the valve can be maintained seated by the energized solenoid coil 30, which is controlled by the electric relay mechanism on the engine. The core of this solenoid is connected with the EAV valve, and this core also carries a valve 19$^a$.

When the solenoid 30 is deenergized, the EAV is opened by the incoming air pressure (equalizing reservoir) and air goes through port 22 to act against piston 46 to open the exhaust port 44'. When the EAV valve is opened, the valve 19$^a$ at the same time is set to connect the passage 46" with a small exhaust port 22" for the outlet of air from the right hand side of the valve organization A, i. e., from the piston chamber 46'. The valve 41 will move to the right gradually under the pressure of air let in through port 22 and under the resistance or control of the air exhausting gradually from the piston chamber 46' through passage 46" and restricted exhaust port 22". A gradual train pipe reduction will result and the brakes will be set without jar or shock. Now when the solenoid is again energized (which will take place when the speed of the train has been reduced to say 5 miles per hour), it will close the EAV valve against the pressure of the air coming in through the small port from pipe 39, thus cutting off further supply of air to the piston 46, and at the same time the valve 19$^a$ will be set in position to connect the passage 46" with a port or passage 46$^a$ leading from the equalizing air pressure supply coming in through the pipe 39, but at a point beyond the valve EAV, so that this air pressure is always available in said port 46ᵃ. As soon as these passages 46ᵃ and 46″ are connected by the port 19ᵇ of valve 19ᵃ, pressure is admitted to the right hand side of the valve organization A to act on the piston 46ˣ and force the valve 41, together with piston 46, leftward, to close the train line exhaust port 44′. At the same time that the valve 19ᵃ is set in the position just mentioned to supply air to the right of valve organization A to move same to closed position the port 19ᶜ in the valve 19ᵃ connects the port 22ᵃ with the outlet port 22″ to atmosphere for the escape of air pressure from the left hand side of the piston 46, so that valve organization A, under pressure of the air in chamber 46′ can move leftward and close valve 41. Thus all parts are restored to normal position again. 19ᶠ is a port to direct air to equalize pressure on valve 19ᵃ.

It will be noted that there is no restoring spring employed either in connection with the valve organization A or with the EAV valve and solenoid core. The solenoid core with EAV valve and valve 19ᵃ are moved in one direction, i. e., to closed position of EAV valve, by the energizing of the solenoid, and in the reverse or opening movement it is operated by the pressure of the equalizing air at the small port where the EAV valve is seated. A piston 19 is arranged to receive the air pressure coming in through the EAV valve so as to move this valve organization to its open or retracted position when the coil 30 is deenergized.

We have said above that the coil 30 is reenergized when the train's speed is reduced to 5 M. P. H. This is an example of one use of this valve mechanism, and it will be understood that the solenoid may be reenergized at a different point in the sequence of train control. I mentioned the 5 M. P. H. point, as the engine equipment will include a contact which will close a current path for reenergizing the solenoid when a safe low speed is reached. This does not mean that the train would not stop under automatic braking at speeds above 5 M. P. H., for, as a matter of fact, a lock is employed to hold an engineer's disabling valve in closed position when once set, so that the engineer can not recharge the train line and release the brakes until the train comes to a stop, whereupon the lock of this disabling valve will be automatically released, so that then the engineer may recharge the train line, release the brakes, and proceed again after stopping, the solenoid already having been energized, as above stated, when the speed reached 5 M. P. H.

An important advantage accrues from the system above described in which the solenoid is reenergized and cuts off operative air to the valve organization A, so that said valve will prevent further train pipe reduction when the speed has come down to 5 M. P. H., because with such system we get a train pipe reduction commensurate with the speed of the train, due to the fact that the solenoid will not be reenergized until the train has been brought to 5 M. P. H. from the speed at which it is travelling at the point of automatic brake application. Obviously if the train is running at 60 M. P. H. when the automatic braking takes place, it will take longer to get down to a safe speed of 5 M. P. H. than if the train is running at 40 M. P. H. when the automatic braking takes place. Consequently when running at 60 M. P. H. the train pipe reduction will continue for a longer period of time than if the train is running at 35 M. P. H. Thus the speed of the train determines automatically the degree of train pipe reduction, this being proportionate to the speed of the train.

Reverting to the valve action, I have provided means for operating the engineer's disabling valve, which is shown generally at B. This valve cuts off the pipe 50, 50ᵃ, so that the engineer can not obtain a supply of air from the main reservoir for recharging the train line. This valve is shown in Fig. 16ᵃ. It consists of discs B¹⁰ and B¹¹ connected by a key B¹² and arranged, when the shaft B⁹ is turned, to open or close the opening in a stationary partition B¹⁴. This valve is operated by an arm B⁸, which in turn is operated by a piston B⁴, when this is moved leftward in Fig. 3. This piston is operated leftward by equalizing air pressure let in through a port 51 from the chamber 15′, in which the piston 46 operates, and the supply of air goes through this conduit as soon as the EAV valve opens. The piston B⁴ is normally held locked by a plunger B³ entering a notch in the piston. The first effect of the air entering through conduit 51 into the chamber Bₓ is to supply air through port 51′ and check valve 51ᵃ to space 51‴ at the left of plunger B¹, thus forcing this plunger or piston rightward till its groove B² comes opposite the plunger B³, whereupon said plunger is free to rise into said groove and release the piston B⁴, which then, under pressure of air in chamber Bₓ, moves leftward and operates arm B⁸ to close the pipe 50ᵃ, which thus cuts off air to the engineer's automatic brake valve (Westinghouse H⁶), and thus prevents the engineer from recharging the train pipe and releasing the brakes.

When piston B⁴ reaches its leftward limit it is locked by the plunger B³ falling into the notch B⁶, and as soon as this happens the piston B¹ will be moved leftward, owing to the air pressure entering through port 51ᵇ, which pressure, added to that of the spring B⁷ (which latter may be omitted), will give the piston B¹ the movement stated. This will bring the plain part of this piston over the locking plunger $B^3$ and hold this down. The parts will be held in this position with the engineer's automatic service valve (Westinghouse $H^6$) disabled until pressure has bled away from chamber $Bx$, back through 51, 15′, 22ª and 22″, and also unitl the disabling valve lock has been released, by reason of the train coming to a stop, and finally until the engineer, after the above conditions have been assumed, operates his independent brake valve $S^6$ or other valve, the latter being hereinafter described, to supply air pressure through port 57 as hereinafter described. This air pressure will pass through a check valve $B^{16}$ to the left hand side of the piston $B^1$, thus moving it to the right to bring the groove $B^2$ thereof in line with locking plunger $B^3$, so that the latter can rise and not obstruct the movement of piston $B^4$ back to normal position, which happens because of the pressure of air exerted in the chamber $Ba$ supplied through port 57. This air finally exhausts through port 103. When the piston $B^4$ is all the way towards the right, the plunger $B^3$ drops into the notch $B^5$ to lock the piston $B^4$ in its normal position. Thereupon the piston $B^1$ moves leftward under action of its spring $B^7$. A port $Bp$ bleeds chamber 51‴ when $B^1$ is rightward.

It will be seen that the only spring in the whole valve organization is the spring $B^7$, which has light duty to perform.

The disabling valve lock is shown in Figs. 1 and 6 to 8 at DVL. It is not applied directly to the engineer's disabling valve, though this might be done. Instead it is applied to a valve $D^1$, which cuts off communication between sections of pipe 57ª leading from the main reservoir to the conduit 57. This valve $D^1$ can be unseated to supply air pressure to conduit 57 for restoring the engineer's disabling valve to normal open position by a hand lever $D^4$. But this hand lever can not be operated until the train has come to a stop, because a lock $D^5$ holds the stem $D^3$ locked and it is this stem which must be operated by the handle $D^4$ in order to unseat valve $D^1$ and allow air to go to the disabling valve for restoring it. This lock is controlled by a magnet $D^8$ which, when the train is moving, is deenergized.

The energizing of magnet $D^8$ and the consequent release of the disabling valve lock $D^5$ of DVL to enable the engineer to restore the engineer's disabling valve to open position is dependent on two factors.

One of these is the closing of contact at $D^{30}$ when the solenoid 30 is again energized and the EAV has closed, consequent upon the train coming down to the prescribed low speed of 5 miles per hour, and the other factor is the closing of the tachometer pointer $D^{11}$ on contact $D^9$ when the train comes to a stop all as hereinafter described. When this happens the brake solenoid 30 has been energized and so far as this is concerned the train is ready to proceed, excepting that the brakes have not yet been released.

The release of the brakes is dependent upon restoring the disabling valve to open position, so that the engineer can recharge the train line, but this can not be done until after the train has come to a stop and tachometer pointer $D^{11}$ has closed onto contact $D^9$.

Fig. 17 shows another form of the disabling valve lock.

Both of the contacts $D^9$ and $D^{30}$ are in the circuit of the tachometer and magnet $D^8$. The battery of this circuit is shown at $D^{12}$, for convenience of illustration. This tachometer contact may be the no speed contact $os$ of the tachometer hereinafter described, and instead of the battery $D^{12}$ the main battery may be used.

Engine electric equipment.

The principal elements of the engine electrical equipment of the accompanying diagrams are: a primary relay PR to pick up current from the traction rail or rails shown in Fig. 23; a brake solenoid 30 which when deenergized causes the brake controlling means to make an automatic train pipe reduction for applying the brakes; a distance control relay DR which includes a screw DS rotated by a flexible shaft from the engine axle; a nut N to engage said screw; magnets having an armature $ar$ pivoted at $pi$ to drop leftward away from the magnets when the latter are deenergized, said armature having the nut N slidably mounted thereon, so that when the armature drops leftward from the deenergized magnets the nut will be made to engage the screw, which nut will therefore traverse the screw to its upper end where it hits a button on the rod $q$ and opens contact SO controlling one of the paths of the brake solenoid (30) current. There is also a high speed contact $hs$ and an advance high speed contact $ahs$ controlling one of the paths of the brake solenoid current and these contacts open when the armature of the primary relay is at neutral. There is also a moderate speed relay MS, a low speed relay LS and a no speed relay OS, the torque of whose coils are relatively regulated so that at a moderate speed of, say at or below 35 miles per hour, the contact 1 of the MS relay will close. The contact 2 of the relay LS will close at or below 5 M. P. H., and the contact 3 of relay OS will close at zero speed, i. e., when the train comes to a stop. These relays are operated from a tachometer, driven from the axle of the engine. There is also the lock DVL for the engineer's disabling valve controlled by the solenoid or magnet $D^8$; a speed indicator SI and a light SCL, which is lighted when the train comes to a stop and which will check the operativeness of the relay circuit because if this breaks while the train is running the contact 3 will close and light this signal.

Figure 13A:
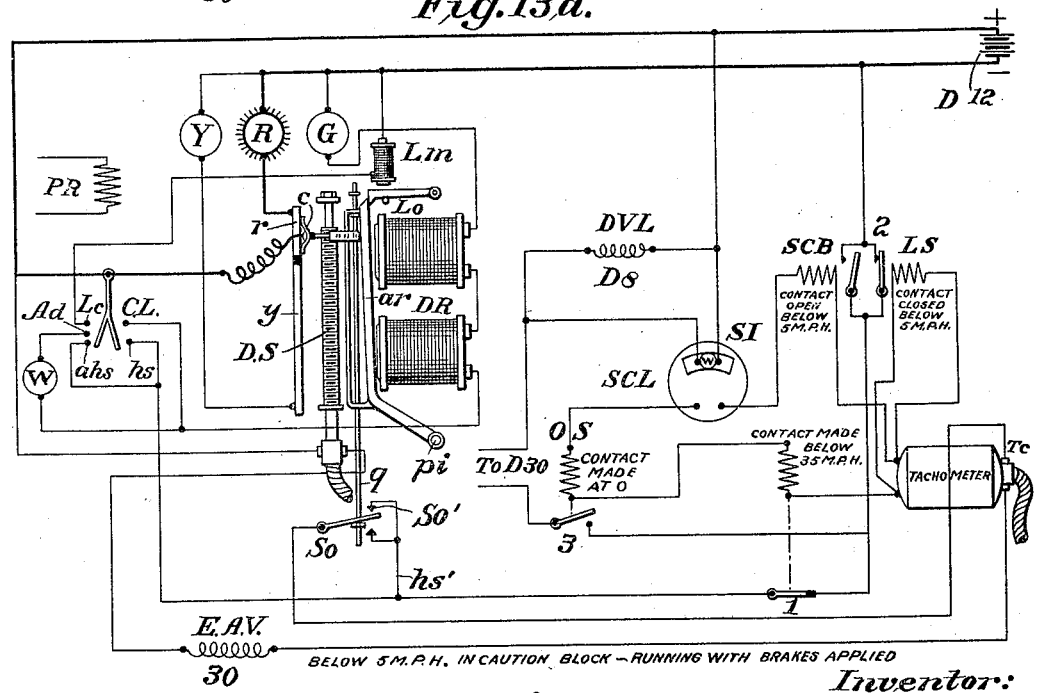
Figure 11:
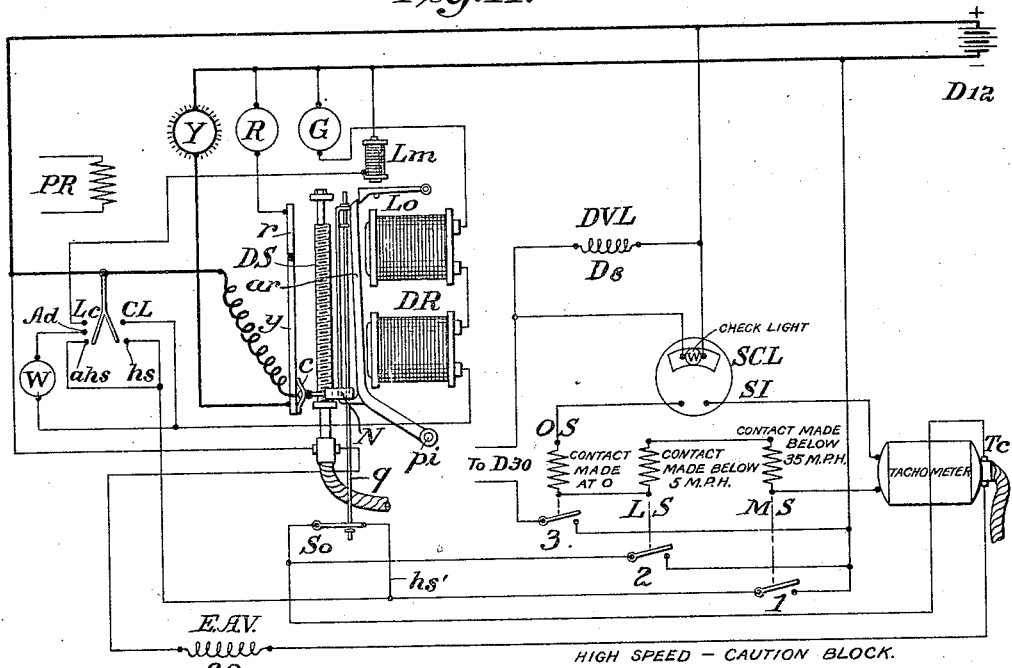

There is also a contact C sliding with the nut N. This contact C is normally not in engagement with the strip $y$, $r$, and hence if the magnets of the DR relay are energized by reason of the train being in live territory, the yellow and red signals will be out and only the green signal will be lighted, but if the train enters a dead block then the falling away of the armature will cause the contact C to engage contact strip $y$ and light the yellow light as shown in Fig. 11, and as it travels with the nut the contact C will engage the strip $r$ and the red light will go on as the braking point is approached as shown in Fig. 13. There is also a lock LO which will prevent the engineer from exceeding a slow speed of, say 5 M. P. H. on entering an energized occupied block, excepting he gets an automatic brake application, this locked condition persisting until there is a reversal of polarity of the current picked up by the primary relay consequent upon the train ahead getting two blocks away as will be described later. The primary relay PR Fig. 23 is of the Du Pre D'Arsonval type, its armature or pointer closing on its contact, on say, potential above plus or minus 1.5 millivolt. This type of relay is like that made by Weston Electrical Instrument Co. of Newark, N. J. Model 30, and disclosed as to its general features in patents of the United States of Edward Weston—for instance, No. 611,722 Oct. 4, 1898 or No. 446,489 of Feb. 17, 1891.

The manner in which the polarity of the current is reversed is hereinafter described in connection with Fig. 24.

During high speed above, say 35 M. P. H., in a clear block, Fig. 9, the contact CL and the high speed contact $hs$ at the primary relay will be closed and the circuits will be established as follows: one through contact CL, the retarded magnets of distance control relay DR, green light G, to minus of battery. The red and yellow lights will be out because sliding contact C will not be in engagement with strip $y$, $r$. These retarded magnets and their function are later referred to.

Figure 9:
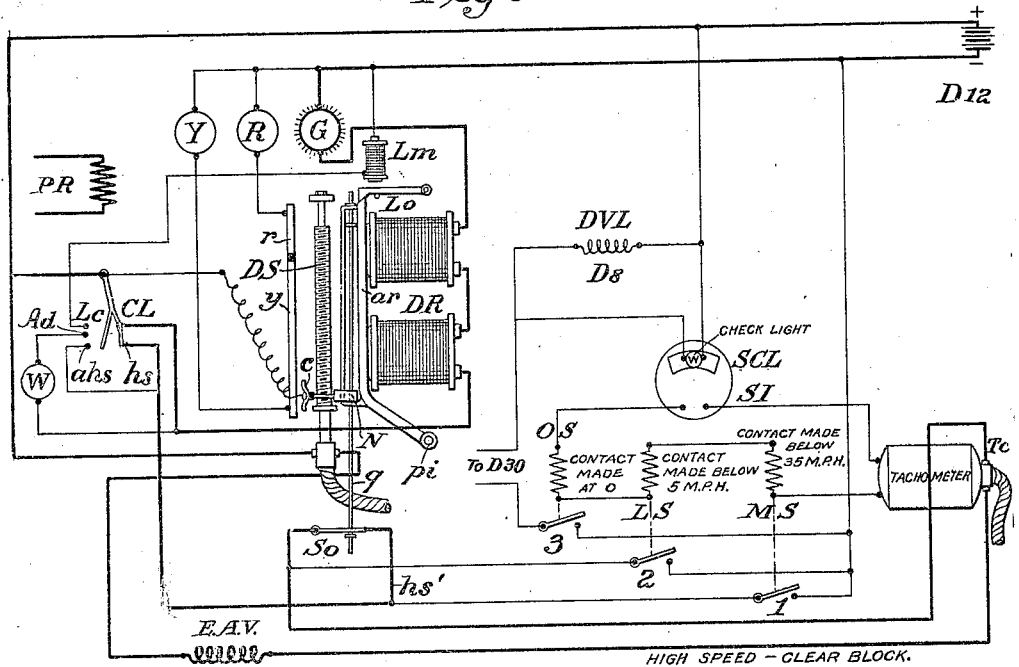

A solenoid circuit will also be established from plus of battery through brake solenoid 30 (which will hold the brake mechanism inactive) through tachometer safety contact TC, thence through contact SO, wire $hs'$ to contact $hs$, and from $hs$, armature of the primary relay, contact CL, to magnets of DR relay and thence to green light G and to minus of battery. From wire $hs'$ the current must go to contact $hs$ because at high speed contact 1 of relay MS is open. As long as the magnets are energized, the nut N, which is slidably mounted on the armature $ar$ of these magnets, will be held out of mesh with the constantly rotating screw DS and consequently will not traverse this screw, and the contacts controlled by this nut will not be changed from normal clear condition and the circuits will be as indicated in Fig. 9.

Figure 10:
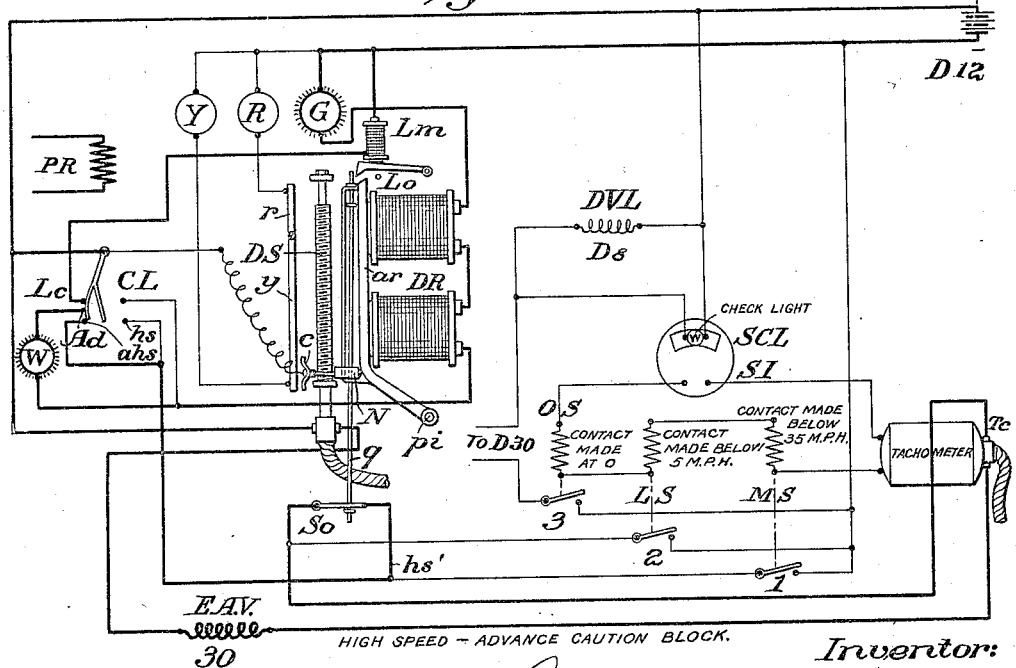

High speed advance caution block—Fig. 10—illustrates the conditions when the train is in an "advance" caution block, i. e., the block on the approach side of the caution or dead block, or, to designate this "advance" block in another way, it is the second block in rear of the occupied block.

When a train is in this "advance" caution block the purpose is to give the engineer an "advance" signal indication notifying him that he is approaching a caution board. In this "advance" block the polarity of the current picked up from the traction rails is reversed in a manner set forth hereinafter in connection with Fig. 24.

Therefore, when the train enters this "advance" block, the armature of the primary relay PR will reverse its position and engage the contacts A$d$ and advance high speed contact $ahs$. The magnets of distance control relay DR are slow acting so that they will maintain armature $ar$ picked up during the time the arm of the primary relay is swinging from contacts CL and $hs$, to contacts A$d$ and $ahs$. The only changes, therefore, in the diagram of Fig. 10 over that of Fig. 9 are (1) that the primary relay has reversed and has closed a circuit through the "advance" contacts A$d$, and $ahs$, thus lighting the white light W, which persists simultaneously with the green light G, this indicating to the engineer that he is in the "advance" block and is approaching a caution board; (2) the primary relay PR in reversing also closes on a contact L$c$, establishing a circuit through a magnet L$m$, which will raise a lock LO. The circuits under the conditions just described are shown in heavy lines Fig. 10. This lock will be referred to hereinafter. For the present it is sufficient to say that this lock under certain conditions will lock the armature $ar$ against being picked up by the magnets of the distance control relay DR, until a certain condition of traffic has been reached.

*High speed caution block.*—Now if the train enters a dead block at high speed, as shown in diagram Fig. 11, the primary relay PR will go to neutral position break contact at A$d$ and CL, and $ahs$, $hs$, and magnets of DR relay will be deenergized and armature $ar$ will fall to the left, for purposes mentioned later. As the brake solenoid circuit now depends upon the contact $hs$ or $ahs$ for its maintenance at high speed, the solenoid 30 will be deenergized, and therefore the brakes will be immediately applied because the deenergizing of the solenoid will open the air valve, which controls the setting of the automatic air release valve for making a train pipe reduction.

When the brakes are applied the engineer's disabling valve is operated to disable the engineer from recharging the train line. This disabling valve is located in the pipe leading from the main reservoir to the engineer's automatic brake valve H⁶, so that the engineer, while disabled from recharging the train pipe, can still make a faster train pipe reduction by manually operating his automatic brake valve. The disabling valve, once it is set in position to disable the engineer, can not be restored to normal open position again until the train has come to a stop, and for this purpose there is provided the automatic lock for the disabling valve, as previously described, to maintain it closed. This lock DVL is controlled by the magnet or solenoid D⁸, which may be energized through the contact 3 of the no speed relay OS, which contact closes only when the train comes to zero speed, i. e., a stop. When this happens (the EAV valve having been closed and the circuit closed at D³⁰, as above mentioned) the solenoid or magnet D⁸ is energized and releases the lock and thereupon the engineer can restore the disabling valve to normal position either by sending air pressure from the independent brake valve S⁶ or through the special manually controlled valve D¹ from the main reservoir, as previously described herein.

In the above example the yellow light Y will take the place of the green light, as shown, because the contact C will engage the strip y when the armature ar drops leftward. This contact is carried by the nut N, and this yellow light will be maintained while the contact C is traversing the contact strip y, it being understood that when the armature ar falls leftward from the deenergized magnets the nut N is set into engagement with the constantly rotating screw DS and traverses this screw, carrying the contact C with it. This traversing action of the nut N, under the example now being considered, will in a sense be an idle movement, the main purpose of the screw coming into play under other conditions about to be described.

*Caution block.*—Moderate speed of, say 35 M. P. H.: If train enters a dead block, Fig. 12, at a prescribed moderate speed of, say at or below 35 miles an hour, the 35 mile contact 1 of relay MS will be closed. High speed contacts hs and ahs will be open because armature of PR is at neutral, but the circuit through brake solenoid 30 will be maintained through this 35 mile contact 1 until the circuit is broken at SO at the time the nut N has travelled to the top of the screw DS and operated rod q by striking the button thereon. When this happens, i. e., the opening of the circuit at distance contact SO by the lifting of the rod q, the brake solenoid 30 will be deenergized and the brakes will be applied. This braking action will take place at a reasonable braking distance from the home board, the length of the screw DS being such that the nut N will open the solenoid circuit at this predetermined distance from the beginning of the caution block. Lock LO will maintain this condition even though the train runs into live territory, until the train ahead gets two blocks away.

*Signals.*—Now when the magnets of the DR relay become deenergized on entering the dead block and the nut has fallen over onto the screw, the contact C, which is attached to the nut, will engage the contact strip y, so that the yellow light will come on at the same time that the green light goes out, and this yellow light will persist while the contact C is crossing the insulated break between the contact strip y and the contact strip r. When the contact C is straddling this insulated break, the yellow light and the red light will be on at the same time, but as soon as the contact slide C gets entirely on the strip r, then the red light will persist alone, and this happens just before the braking point is reached, so that the engineer will be notified that he is approaching the point of automatic application and in order to continue must reduce his speed to 5 M. P. H.

Under the conditions just described, like in the case above described, once the solenoid 30 is deenergized, the engineer's disabling valve is set so as to prevent the engineer from recharging the train pipe and the train must come to a stop.

Figure 12:
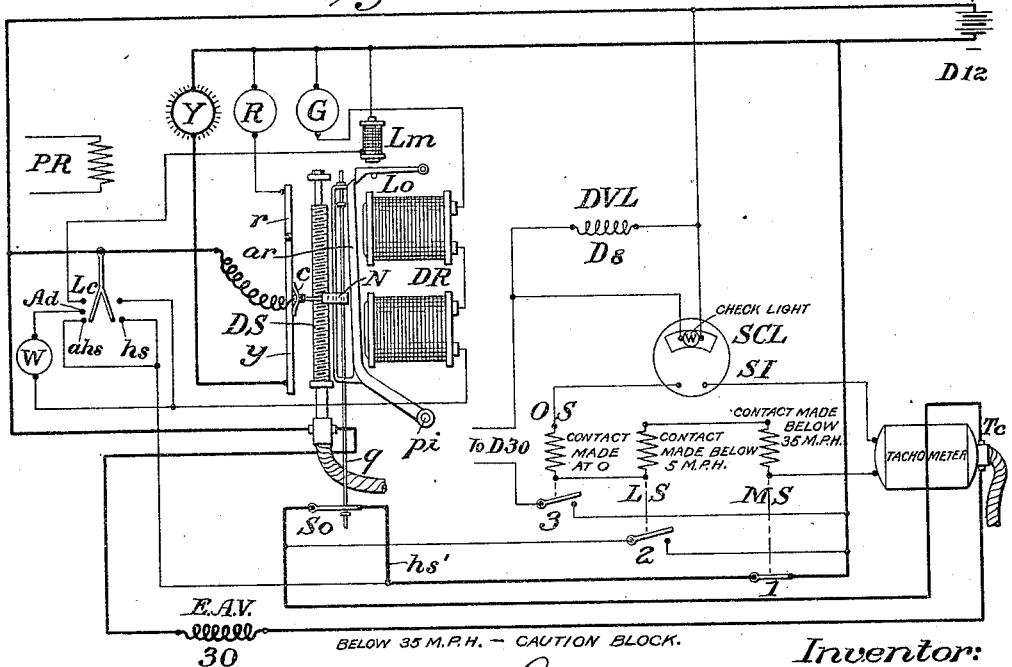

Fig. 12 shows that the engine has entered the caution block at moderate speed and is proceeding to the point in said block where the brakes will be applied automatically, if the engineer takes no action. The nut N is in course of travelling along the screw DS and the solenoid 30 remains energized despite the fact that the high speed contact hs is broken, the solenoid circuit being maintained through contact 1 of the moderate speed relay MS, and this condition will persist until the nut N reaches the upper end of its travel and breaks contact at SO by lifting the rod q, whereupon the brakes will be applied automatically by the deenergizing of the solenoid 30.

*Starting up again in dead block.*—Under either of the above conditions after the train has come to a stop it can be started again because as soon as the speed has been lowered to or below 5 M. P. H., the contact 2 of the low speed relay LS is closed, making a path for the current from plus of battery through the brake solenoid 30 and through contact 2 of low speed relay LS to minus of battery, and this circuit is maintained when the train has come to a stop because the relay LS will have its contact closed at all speeds from 5 M. P. H. to zero.

We would then have a condition in which the train is at rest, solenoid 30 is energized, contact D³⁰ made, and consequently the air brake controlling mechanism is restored to normal position again, and because the train is at rest and contact 3 closed the engineer's disabling valve lock is released and the engineer can restore this valve to normal open position, and thereafter he can recharge the train line and release the brakes.

He can proceed at low speed, i. e., below 5 M. P. H. Should he exceed this speed in the dead block, the low speed relay LS will open its contact 2 and thus the circuit of the brake solenoid will be broken at this point and an automatic brake application will result.

*Slow speed in dead block.*—Should the engineer enter the dead block at a prescribed safe low speed, say at or below 5 M. P. H. (see Fig. 13), the contact 2 of the low speed relay LS is closed and the circuit through the brake solenoid 30 will be maintained and the brakes held off, as long as this slow speed is maintained. This, in spite of the fact that all contacts at the relay PR opened immediately on entering the dead block and the magnets of distance control relay DR were deenergized, and in spite of the fact also that contact SO opens after the train has gone a prescribed distance, and the nut N has traversed the screw DS and has pulled up the rod q, and opened contact at SO.

*Speed control lock.*—An automatic lock is provided to hold the engineer down to a safe low speed upon resuming travel in a dead block after a stop, or on entering a dead block at, say a safe speed of 5 M. P. H., or on entering an energized or occupied block, as indicated in Fig. 14, said lock being released only when the train ahead gets two blocks away, or into a position bringing on the condition of an advance caution block, above mentioned.

For this purpose the lock LO is provided, which will drop behind the armature *ar* of the relay DR as soon as this assumes its position away from the magnets, due to these magnets being deenergized. This lock will prevent the armature from being picked up again by these magnets until the train in advance gets two blocks away, when, due to the reverse polarity of the current received by the primary relay, Fig. 10, as described hereinafter in connection with Fig. 24, the armature of this primary relay PR will engage the advance contact A*d* and energize magnet L*m* and raise the lock LO and thus permit the magnets of relay DR to pick up their armature, and cause the nut N to drop, by withdrawing it from the shoulder at the upper end of the screw DS upon which it has been resting. The dropping of the nut will allow contact SO to close. It will thus be seen that the train having entered a dead block, and the armature of relay DR having been locked in its "dropped" position, the circuit of the solenoid is controlled entirely by the contact 2 of low speed magnet LS, and even though the train enters a live block the speed can not exceed 5 M. P. H. in that live block, because it requires a current of reverse polarity to release the lock LO and this can not happen until the train ahead gets two blocks away from the following train. Of course the same locking effect will take place on the engine entering a dead block at or below 5 M. P. H. This engine must proceed at this low speed, else a stop will result, until the train ahead gets two blocks away.

While the train is in the occupied block, i. e., live territory, under the above condition i. e. at a speed below 5 M. P. H., the red and green lights will be on, so that the engineer will know that he is in an "occupied" block. This signal condition will be due to the fact that the magnets of DR relay will be energized and thus the green light will be on, and so far as the red light is concerned, this will be lighted because the contact C will still be on the strip *r*, because the armature is held locked in its dropped position by the lock LO.

In Fig. 16 I show a valve organization in which the automatic air release valve A of the previously described organization is omitted, and in this new organization I employ only the solenoid actuated valve EAV and the engineer's disabling valve B in combination therewith.

When the valve EAV is seated by the energized solenoid coil 30, equalizing reservoir air pressure is cut off from this new valve organization and conversely air is supplied to said valve organization upon the opening of the EAV valve, due to the deenergizing of its coil 30. When the EAV valve is closed, the engineer's disabling valve may be either in normal open position, or in closed applied position, that is to say, under certain conditions the valve EAV may close, while the disabling valve is still performing its function of disabling the engineer from recharging the train line and releasing the brakes.

The engineer's disabling valve is shown in Figs. 16 and 16ª. Its port 51 receives equalizing reservoir pressure through the space 19ᵉ of the valve 19ª from the passage 46ª when the EAV valve opens and moves the valve 19ª to its retracted position, and the disabling valve, as above described, is thereby set in closed position to disable the engineer from recharging the train line.

In the closed position of the EAV valve the port 19ᵈ in valve member 19ª connects passage 51 with the supplemental exhaust port 22″ leading to atmosphere, so that in restoring the engineer's disabling valve to open position, air pressure will be discharged through this port from the right hand side of the piston B⁴.

Assuming the train is travelling at a high rate of speed and is approaching a clear indication point, the engineer will have a green light. If this indication point is in the immediate rear of a caution indication point, his green light will persist after he has passed this clear indication and a white light will come on to persist jointly with the green, denoting that he is approaching a caution indication point, and indicating to him that he should bring the speed of his train down under control, say 35 M. P. H. But if we assume that he does not do this and passes the caution indication point at this high rate of speed, the following operation of the valve organization of Fig. 16 will take place: The coil 30 of the EAV valve will be deenergized and equalizing air pressure in pipe 39 will force EAV open and cause piston 19 to travel. This in turn will cause ports 46$^a$ and 51 to be brought into communication with each other by movement of valve 19$^a$, and as a result of this, arm B$^3$ of the disabling valve B will be forced leftward to cut off all connection between the main reservoir and the usual air brake system, such as Westinghouse, and thus render the train line incapable of being recharged.

In continuity with this action the piston 19 continuing its travel uncovers port 22″, allowing pressure in chamber D and equalizing reservoir (Westinghouse) to exhaust to the atmosphere.

The reduction of pressure in chamber D of the engineer's big brake valve (as H$^6$ Westinghouse) will allow the equalizing piston to be forced upward by brake pipe pressure beneath it, opening the usual B. P. Ex. and thus reducing train line pressure and causing an automatic application of the brakes.

This condition will persist until the speed of the train has been brought down to, say 5 M. P. H., when the 5 mile contact of relay LS will close, reenergizing coil 30 of the EAV valve, thus closing this valve and leaving the brakes in a complete lapped condition, port 22″ being closed and the disabling valve B being also closed.

Train line air will continue to exhaust through B. P. Ex. until its pressure has fallen to an amount a trifle less than that contained in chamber D, permitting the pressure in this chamber to force the piston downward gradually and stop the discharge of brake pipe air. It will be seen therefore that the amount of reduction in the equalizing reservoir determines that in the brake pipe, regardless of the length of the train.

The disabling valve B now is in closed or applied position and can not be restored to normal or open position until the train has been brought to a stop, and, as before described, air pressure has been sent through port 57 of the disabling valve, restoring the disabling valve to normal open position, so that then the engineer can recharge the train line and release the brakes.

It will be seen that the amount of brake application in this form, as in the form first described, will be determined by the speed of the train; the higher the speed the greater the train pipe reduction in coming down to a speed of 5 miles per hour.

The primary relay PR is in a conductor receiving current from the traction rail system, due to the potential drop between its points of contact therewith. This primary relay is in continuous conductive connection with the electrical track system.

At Tc, Fig. 15, I provide a safety device which will bring on an automatic brake application by breaking the circuit of the solenoid 30, should the shaft of the tachometer break. If this happens, a spring $f'$ will force the slidable contact $fs$ from normal position and thus break the said circuit.

I do not limit myself to the specific organizations described. The specification and description are presented as illustrative of my invention and not restrictive upon its scope which is defined by the appended claims.

The re-energizing of the solenoid 30 may take place at a different point in respect to the movement of the train than that mentioned.

The distance control relay DR will stop a train in a dead block at a prescribed distance after passing the caution signal, regardless of its speed or the number of intermediate stops it may make, so long as the block remains dead.

In all the Figures 11, 12, 13, 14, the lock LO will persist and prevent dropping of the rod $q$ and closing of contact $So$ even though the train runs into an occupied block and energizes magnets DR. These conditions will persist until the train ahead gets two blocks away and the polarity of the current changes. This change of polarity is obtained in a manner disclosed in Fig. 24 hereinafter referred to. Features of the invention are not restricted to the character of the electric current employed.

In Figs. 9$^a$ and 13$^a$ I show means associated with the tachometer circuit for taking care of conditions arising from failure of this circuit by breakage. In these figures a relay SCB has its magnet in series with the magnets of relays OS and MS. Its contact is in the common wire leading to minus of main battery D$^{12}$.

The low speed relay LS has its magnet in a circuit of its own energized by the tachometer, and the contact of this relay also controls the circuit through the common wire leading to minus of the battery D$^{12}$.

SCB opens its contact below 5 M. P. H., and LS closes its contact below 5 M. P. H.

Diagram 9$^a$ represents high speed conditions in a clear block. In this diagram the solenoid circuit breaker SCB will come into play if for any reason the track circuit fails with the tachometer circuit in broken condition. Under these circumstances, and supposing SCB were not present in the system, we would still have the solenoid circuit maintained through contact 1 and the brakes would be held in released condition despite the fact that the primary relay had assumed neutral position. With the circuit breaker SCB in the system, however, we would get a break in the solenoid circuit at SCB, at this high speed (low speed contact 2 being open), the moment that the tachometer circuit accidentally broke, with a brake application consequent upon deenergizing of the solenoid 30, the primary relay PR having assumed neutral position as a result of the failure of the track circuit. It will be noted too that low speed contact 2 of the LS relay will be open at the same time that the contact of SCB is open, for the reason that we are considering the high speed condition and under this condition contact 2 is open. It closes only when the speed is low, say 5 M. P. H.

Now supposing the circuit in which the magnet of the low speed relay LS is located broke simultaneously with the breaking of the main tachometer circuit in which the magnet of SCB is located, we would still get a break in the solenoid circuit, despite the fact that the contact 2 of the relay would close, because the closing of this contact is delayed, and it does not close until after the contact of SCB has opened and broken the solenoid circuit. For this purpose the magnet controlling low speed contact 2 is retarded in its drop away in respect to the drop away of magnet SCB, so that even though the circuit of low speed relay LS should break simultaneously with that of SCB, the contact 2 would not close until SCB had been open long enough to deenergize the solenoid 30 and apply the brakes. When contact 2 closes the solenoid 30 would be energized again, and even though the brake pipe reduction up to this moment has not been sufficient to stop the train, a sequence of actions has been started which will accomplish this result. This will be due to the following: When the PR relay assumed neutral position the magnets of the relay DR were deenergized and nut N began its upward travel and thus after the predetermined distance has been traversed by the train, the contact SO will open and the solenoid will be deenergized again and the brakes will go on for a secondary application. This second braking action will definitely indicate to the engineer that his tachometer circuit is in broken condition.

Now in order to reenergize the brake solenoid so that the engineer can proceed after a stop, I have provided another contact $SO^1$ which is closed when the nut N reaches its upper limit. The solenoid 30 is retarded in becoming de-energized so that when the nut N and rod $q$ fall down to their starting position, the consequent momentary open position of the circuit at SO, $SO^1$ will not result in deenergizing the solenoid, and hence there will be no automatic brake application while the armature of SO is rapidly moving down onto this contact.

*Advance caution block.*—The conditions would be the same as those just described under like circumstances, excepting that the PR relay would be in reverse position.

Figure 9A:
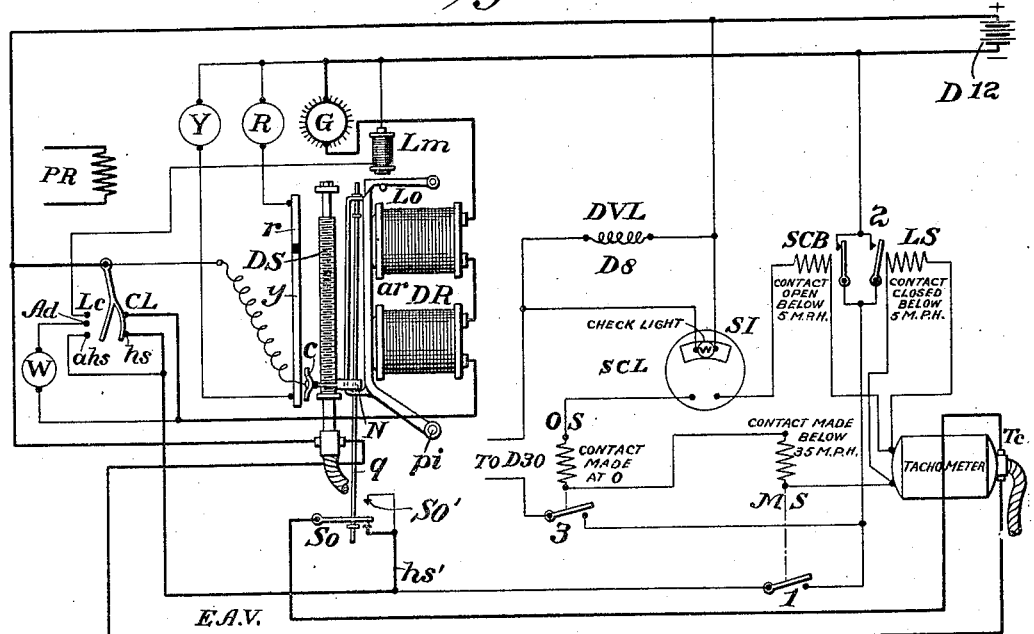

*High speed caution block.*—If the tachometer apparatus in Fig. 11 were like that shown in Fig. 9a, breakage of the tachometer circuit, under the condition of high speed in caution block, would result in opening the solenoid circuit at SCB, primary relay PR being neutral. This opening of the solenoid circuit at SCB counteracts the closing of the solenoid circuit at 1, consequent upon the rupture of the tachometer circuit.

*Below 5 M. P. H. in caution block, running with brakes applied.*—Diagram 13a illustrates this condition in a system like that described above in connection with Fig. 9a. In this diagram 13a, magnet of SCB is designed to allow its contact to open at a speed below 5 M. P. H. Contact 2 of the low speed relay LS closes at said speed. Medium speed contact 1 is closed. This diagram shows the conditions below 5 M. P. H. in a caution block, with the brakes applied but with the train still running but about to be brought to a stop at the red board. Here the nut N has nearly, though not quite, reached the upper limit of its travel and the contact SO has assumed an open position about midway between its front and back contacts. The solenoid circuit is therefore broken at SO and the brakes are applied.

Nut N, continuing its upward movement, closes front contact $SO^1$, and because contacts 1 and 2 are also closed the solenoid circuit is reestablished. The train will come to a stop, however, because disabling valve lock will not be released and the engineer can not recharge the train line until the full stop has taken place.

The train is now ready to be started again, owing to the reenergizing of the solenoid as just stated, by reason of front contact $SO^1$ being closed, and the engineer can proceed into the occupied block, but only under restrictive speed, say of 5 M. P. H., or below. Should he exceed this speed, contact 2 will open quickly because its coil is of the quick pick-up type and slow drop away. The magnet of SCB is slow pick-up and quick drop away, so that with a speed above 5 M. P. H., we would get a break of the solenoid circuit at this point.

From the above it will be seen that the apparatus makes it mandatory that all signal indications be obeyed. At the stop indication or home board the train will be brought to a full stop but the engineer can then proceed under restrictive speed.

In this diagram 13ᵃ the tachometer is running slowly and is generating a weak current. This is strong enough to hold OS open but will drop SCB and LS contacts.

*Switch clearing condition.*—Referring to Figs. 18, 19 and 20: Located at each switch in a track with automatic block signals is a switch circuit controller, so connected to the switch point by a rod that when the switch is open the circuit through the switch box is open. They are generally made with four contacts, not all of which may be used at one time. The switch box is usually arranged to shunt the track circuit, although it is sometimes placed in the circuit that controls, at least, the first home signal in the rear, so that when the switch is open the home signal will give the stop indication.

We will assume that a train has entered a block governed by the present system and somewhere ahead of the train a track switch is opened. Either of two operations of the engine apparatus will begin at once, i. e., if the engine is traveling at high speed the solenoid 30 will be deenergized and result in a brake application immediately. If the speed is less than 35 M. P. H., the distance control will begin. In either event, the armature of the DR will fall and the lock LO will drop behind it, securely locking it in fallen position. Under this condition, when the switch is again closed, the current will be restored to the track and the DR reenergized, but its armature cannot be attracted to a closed position on account of LO, which must have polarized current to attract it from its locked position. Hence the train could not, at any time, resume a speed above 5 M. P. H., until it got into an advance caution block. In order to overcome this condition, I provide a means to momentarily cause a change in the polarity of the circuit as a consequence of the movement of the switch to closed position. This will unlock LO, allow the armature of DR to pick up, the red light will disappear, the green remain, and the engineer may resume speed. This operation pertains to the ordinary switch in the traffic rail used to divert traffic, and the means I have provided pertain to the switch alone and are not influenced by the train movement or the position of the train relative to the blocks.

The means that I have provided comprises a circuit closer operated by the rail switch to momentarily or for a sufficient length of time, reverse the polarity of the circuit of the primary relay on the engine, so that the lock LO will be released.

This circuit closer is disposed so that the reverse polarity current will exist during the movement of the switch from open to closed position, the making of this reverse polarity circuit being established at an intermediate point in the throw of the rail switch. When the switch is entirely closed then the normal polarity circuit is established and when the switch is open the circuit is open.

In the drawing, Figs. 18, 19 and 20 are diagrams illustrating the principle involved, while Fig. 22 shows the device incorporated in the track circuit.

Referring to Fig. 22, this shows the switch of Figs. 18, 19 and 20 in the track circuit, it being understood that said Figs. 18 to 20 omitted the track circuit with a view to illustrating in a more concise manner the way that the reversal of the current takes place, as a result of the closing of the track switch.

The track circuits are the same as shown in Fig. 24.

With the track switch closed i. e., under normal conditions, current will flow from plus of imposed battery III¹, through contact 114, contact P, arm SC, wire CW (left hand branch) or pole line, contact 115, armature 116 to track rail at 118 to 151, armature 119, contact 110, contact 111, pole line (right hand branch of CW) through other arm SC to contact N to minus of battery III¹. This circuit path corresponds to the position of the apparatus shown in Fig. 18. The vehicle is shown in Figure 22 and the course of the current through the primary relay PR is indicated.

In effect the action is shown in Fig. 18, for it will be obvious that the wire CW in this figure corresponds with the pole line in Fig. 22, with the various armatures and contacts omitted, the connection to the pole line CW in both instances being through the arms SC and the contacts P and N.

Now considering the open position of the rail switch, as in Fig. 19 and reading this condition on the diagram of Fig. 22, it will be seen that the circuit is open at the ends of the pole line CW because both arms SC are on the insulated portions of the device. Under this condition the primary relay on the vehicle will be at neutral position, as indicated in Fig. 19, the circuit being dead.

Now referring to Fig. 20, which shows the rail switch mechanism in the act of being closed: current will flow from imposed battery III¹ through contact 114 to P, P¹, arm SC (the lower one in Fig. 20, or right hand one in Fig. 22) through pole line CW (right hand branch in Fig. 22) through contacts 111, 110, armature 119 to rail at 151, thence to 118, 116, 115, CW (left hand branch) to the other arm SC, N′, N to minus of battery, so that the direction of current picked up by relay PR will be the reverse of that picked up under normal conditions of Fig. 18 and armature of PR will swing to its "advance caution" position. This reversal of current will take place while arms SC are passing over contacts N′ and P′.

While arms SC are passing from N' and P' to N and P the armature of the relay PR will go to neutral but this will have no effect, as the zero contact OS will not open the solenoid circuit until the train exceeds the prescribed limit of speed, say five miles per hour, and as soon as SC contacts with P and N the relay PR will be in the position shown in Fig. 18, the green light will show and engineer may proceed at high speed because conditions now are normal. The primary relay PR is in circuit wire cw, and the contact sc (switch contact) is attached to the switch operating rod sr. When the switch is closed, the contact sc, which is composed of spring arms or fingers, is on the contacts P, N, and the current from battery is then in the direction of the arrows, Fig. 18.

When the switch is open the switch carried contact sc is in the position of Fig. 19, and the polarized relay PR is in neutral position, and when the switch is on its return movement it closes on contacts P¹ and N¹ and a reverse polarity current is sent through the polarized relay, as in Fig. 20, and when the switch is again fully closed, sc is closed again on contacts P, N, and the normal polarity circuit is again established, as in Fig. 18.

This action of the switch is due to connecting P and P¹ and N and N¹ electrically, as indicated in said figures, and employing a guard cam gc which, when the switch contact sc moves to the right, will compress its spring arms, as shown in dotted lines, Fig. 18, and allow them to pass by the contacts P¹ and N¹ without contacting therewith, but on the return of the rail switch to closed position, the spring contact members of sc will spread apart and engage contacts P¹ and N¹ and momentarily reverse polarity and operate lock LO, and the final movement of the rail switch to closed position will establish the primary relay circuit again, as in Fig. 18.

Fig. 24 illustrates the track circuits and discloses the manner in which the polarity of the current is determined under different traffic conditions.

Suppose a train enters block #3. Track relay T of the block #3 will become de-energized and the contacts 125—126 will open circuit from the local battery LB and relay Ax contacts 123 and 124, 115 and 116 close the main circuit as follows:

*Left rail.*—Plus of the main battery III¹, contact 114, pole line, contacts 115 and 116, left rail from point 118 to 151, conductor 151—119, contacts 119—110, contact 111, minus of battery.

*Right rail.*—Plus of the main battery III, contact 122, pole line, contacts 123—124, right rail from point 117 to 161, conductor 161—171, contact 171—181, contact 191, minus of battery. The described paths of the main current on block #3 can exist only when the block ahead, #4, is clear. Relay Ax of this block #4 is energized and contacts of this relay 119—110, 171—181 are closed. If, however, another train is on block #4, then the above described circuits of the main current on block #3 will open and the train entering this latter block will be stopped automatically by the absence of control current in the rails. Relay Bx of block #3 is shown energized. This condition will exist when blocks #4 and #5 are clear. Working circuit for this relay is: Relay Bx, point 127, pole line, plus of the main battery IV on block #4, minus of battery, contacts 181—171, right rail from 161 to 117, contact 124, relay Bx. If, however, relay Ax of block #5 is deenergized, by presence of another train in this block, contacts 171—181 will open the above described circuit of relay Bx and its contacts drop. Contact arms of relay Bx will reverse the direction of the main circuit on block #3, as can be easily traced from the drawing, and this opposite direction of current in the rails will light the additional "advance signal" in the cab of the locomotive.

I claim:

1. In combination in automatic train stop apparatus, an automatic valve for releasing train line air, an engineer's disabling valve, a valve for supplying equalizing reservoir air to the automatic air release valve and the engineer's disabling valve, to operate the former to both open and closed positions and to operate the latter to closed position for cutting off main reservoir pressure from the engineer's automatic service valve, substantially as described.

2. In combination in automatic train stop apparatus, an automatic valve for releasing train line air, an engineer's disabling valve, a valve for supplying equalizing reservoir air to the automatic air release valve and the engineer's disabling valve, to operate the former to both open and closed positions and to operate the latter to closed position for cutting off main reservoir pressure from the engineer's automatic service valve, said air supply valve being held closed by a solenoid when energized to cut off the supply of equalizing reservoir air, substantially as described.

3. In combination, a primary relay on the engine, said primary relay having three positions, clear, neutral and advance caution, said relay assuming the latter position due to reversal of polarity in the current of the advance caution block, an electro-magnetic braking device, means for holding the train down to a safe low speed, a locking device for maintaining said means in condition for low speed, and a magnet for releasing said locking device when the primary relay is in advance caution position, substantially as described.

4. In combination, a primary relay on the engine, an electro-magnetic device on the engine for setting the brakes when deenergized, a distance control relay controlled by said primary relay and including a screw driven from the engine axle, a nut to engage said screw, electro-magnetic means receiving current through the primary relay and an armature controlling the engagement of the nut with the screw, a high speed contact controlled by the said primary relay for deenergizing the electro-magnetic brake controlling device to immediately apply the brakes on entering dead territory at high speed, a distance contact in circuit with the electro-magnetic brake controlling device, said contact being opened by the nut when it reaches the braking point along the screw, a moderate speed contact controlling the circuit through the electro-magnetic brake controlling device, remaining closed at or below a prescribed moderate speed and maintaining said brake controlling device energized until the circuit is opened at the distance contact, substantially as described.

5. In combination, a primary relay on the engine, a distance relay controlled thereby, automatic brake application means, including an electro-magnetic device, and an engineer's disabling valve, a lock for said valve, to prevent the engineer from recharging the train line until the train has come to a stop, a slow speed contact for closing a circuit through the electro-magnetic brake device to reenergize it to normal position when the train comes down to or below the prescribed slow speed, whereby the train may be started up again on deenergized territory after coming to a stop, said contact opening again should the prescribed slow speed be exceeded to thereby automatically apply the brakes.

6. In combination, a primary relay on the engine continuously controlled from the traction rail system, an electro-magnetic brake controlling device, together with means for controlling the said brake controlling device, to apply the brakes at high speed in a dead block, or, to apply the brakes at a prescribed braking distance from the home board if the vehicle enters the dead block at moderate speed, a slow speed contact which is closed if the vehicle enters the block at or below a prescribed slow speed to maintain the circuit through the electro-magnetic brake device, to allow the train to proceed if it enters a dead lock at said slow speed, an engineer's disabling valve operated to prevent the engineer from recharging the train line for releasing the brakes when the said electro-magnetic brake controlling device is deenergized, substantially as described.

7. In combination, a primary relay on the engine, a solenoid controlling automatic brake application means to set the brakes when deenergized, a high speed contact controlling circuit to said solenoid, and controlled by the primary relay to open the said circuit when the primary relay assumes neutral position, a distance contact controlling current to the solenoid, a distance control device including a screw driven from the engine axle, with a nut to control the distance contact electro-magnetic means, said nut being controlled as to its engagement with the screw by the armature of said electro-magnetic means, a moderate speed contact for maintaining the circuit through said solenoid at or below a moderate speed until said circuit is opened at the distance contact, a low speed contact to maintain the circuit through said solenoid at or below a low safe speed, an engineer's disabling valve, a lock therefor, a no speed contact for releasing said lock when the train comes to a stop, to allow the engineer to recharge the train line, a tachometer for energizing the coils of said moderate, low and no speed contacts, a lock for the armature of the electro-magnetic means to hold it in released position with the circuit open at the high speed and distance contacts, a magnet for releasing said lock, the circuit of which is closed when the primary relay reverses due to reversal of polarity of the current in the traction rail system, substantially as described.

8. In combination, a primary relay on the engine, a solenoid controlling automatic brake application means to set the brakes when deenergized, a high speed contact controlling the circuit of said solenoid, and controlled by the primary relay and opening the said circuit when the primary relay assumes neutral position, a distance contact controlling the circuit of the solenoid, a distance control device including a screw driven from the engine axle, with a nut to control the distance contact, said nut being controlled as to its engagement with the screw by the armature of said electro-magnetic means, a moderate speed contact for maintaining the circuit through said solenoid at or below a moderate speed until said circuit is opened at the distance contact, a low speed contact to maintain the circuit through said solenoid at or below a low safe speed, an engineer's disabling valve, a lock therefor, a no speed contact for releasing said lock when the train comes to a stop, to allow the engineer to recharge the train line, a tachometer for energizing the coils of said moderate, low and no speed contacts, a lock for the armature of the electro-magnetic means to hold it in released position with the circuit open at the high speed and distance contacts, a magnet for releasing said lock, the circuit of which is closed when the primary relay reverses due to reversal of polarity of the current in the traction rail system, clear, caution and danger signals, an advance caution signal, said danger (red) and clear (green) signals persisting when the train is in an "occupied" block at or below the prescribed low speed.

9. In automatic train stop apparatus, a primary relay on the vehicle, a valve controlling an exhaust port for equalizing reservoir pressure, a solenoid holding said valve closed when energized and controlled by the primary relay, an engineer's automatic brake valve (as H⁶ Westinghouse) having an exhaust port for train line air and which is opened on reduction of equalizing reservoir air pressure in the system, an engineer's disabling valve to prevent the engineer from recharging the train line, said disabling valve being set in disabling position by equalizing reservoir air introduced thereto through the solenoid controlled valve mechanism, when said solenoid is deenergized, locking means for holding the disabling valve when set in disabling position until the train comes to a stop, means for releasing the lock when the train stops, and means for reenergizing the solenoid to close its valve and cut off equalizing air pressure from the engineer's disabling valve when a prescribed speed of the train is lacking for the restoring of said valve, substantially as described.

10. In automatic train stop apparatus, a primary relay on the vehicle, a valve controlling an exhaust port for equalizing reservoir pressure, a solenoid holding said valve closed when energized and controlled by the primary relay, an engineer's automatic brake valve (as H⁶ Westinghouse) having an exhaust port for train line air and which is opened on reduction of equalizing reservoir air pressure in the system, an engineer's disabling valve to prevent the engineer from recharging the train line, said disabling valve being set in disabling position by equalizing reservoir air introduced thereto through the solenoid controlled valve mechanism, when said solenoid is deenergized, locking means for holding the disabling valve when set in disabling position until the train comes to a stop, means for releasing the lock when the train stops, and means for maintaining the solenoid energized if the speed is reduced to a prescribed low rate before restrictive conditions ahead occur.

11. In automatic train stop apparatus, a primary relay on the vehicle, a valve controlling an exhaust port for equalizing reservoir pressure, a solenoid holding said valve closed when energized and controlled by the primary relay, an engineer's automatic brake valve (as H⁶ Westinghouse) having an exhaust port for train line air and which is opened on reduction of equalizing reservoir air pressure in the system, an engineer's disabling valve to prevent the engineer from recharging the train line, said disabling valve being set in disabling position by equalizing reservoir air introduced thereto through the solenoid controlled valve mechanism, when said solenoid is deenergized, locking means for holding the disabling valve when set in disabling position until the train comes to a stop, means for releasing the lock when the train stops, and means for maintaining the solenoid energized if the speed is reduced to a prescribed low rate before restrictive conditions ahead occur, and for reenergizing said solenoid when the train comes to a stop as a consequence of the automatic application of the brakes at higher speeds, substantially as described.

12. In train control apparatus, a primary relay on the vehicle, an electro-magnetic device on the vehicle controlled primarily by the primary relay for setting the brakes when de-energized, means for insuring the train coming to a stop when the said electro-magnetic device is de-energized, said means comprising an engineer's disabling valve to prevent him from recharging the train line, and a lock for maintaining said valve in disabled condition until the train comes to a stop, means for releasing said valve lock when the train comes to rest, means for re-energizing the said electro-magnetic device so that when the train comes to rest the brakes may be released, and means whereby the engineer may restore the disabling valve, when unlocked, to normal open position so that he may then recharge the train line and release the brakes, substantially as described.

13. In combination in train control apparatus, a primary relay on the vehicle energized continuously by current from the traffic rail system of an energized block, and de-energized when the vehicle is on a dead block, a distance control relay having a member driven from the vehicle axle, and a circuit closing contact driven thereby and travelling a distance proportionate to the distance travelled by the vehicle, when in driving engagement with said first mentioned member a contact to be engaged by the first mentioned contact, said distance control relay also including an electro-magnetic device controlled by the primary relay and causing the engagement of the members mentioned, when said primary relay is de-energized, and means of train control controlled by said travelling member, said means of train control comprising a signal device or devices on the engine controlled by the said contacts.

14. In combination in train control apparatus, a primary relay on the vehicle energized continuously by current from the traffic rail system of an energized block, and de-energized when the vehicle is on a dead block, a distance control relay having a member driven from the vehicle axle, and a member driven thereby and travelling a distance proportionate to the distance travelled by the vehicle, when in driving engagement with said first mentioned member, said distance control relay also including an electro-magnetic device controlled by the primary relay and causing the engagement of the members mentioned, when said primary relay is de-energized, and means of train control controlled by said travelling member, said means of train control comprising a plurality of signal lights lighted in sequence by said travelling member.

15. In combination in train control apparatus, a primary relay on the vehicle, a distance control relay comprising a screw shaft driven from the vehicle, a nut to traverse the screw a distance proportionate to the distance travelled by the vehicle while the nut is in engagement with the screw, said distance control relay including also an electro-magnetic device for controlling the engagement of nut and screw, and in turn controlled by the primary relay, and means for controlling the train controlled by the said travelling nut when the speed of the train is below a prescribed speed, and speed controlled means for exercising control when the speed of the vehicle exceeds said prescribed speed.

16. In combination in train control apparatus, a primary relay, an electro-magnetic brake controlling device on the engine, a distance control relay in circuit with the armature of the primary relay, and when de-energized causing one of its members to travel a distance proportionate to the distance of the braking point from the entrance to a dead block, said distance relay automatically opening the circuit of said electro-magnetic braking means when the braking point is reached, a re-energizing circuit for said electro-magnetic device controlled in part by the distance control relay, and means for completing said re-energizing circuit when the train movement is wanting in a prescribed degree, and for again de-energizing the said electro-magnetic means when the train again exceeds a prescribed speed in the dead block, substantially as described.

17. In combination in train control apparatus, a primary relay, an electro-magnetic brake controlling device on the engine, a distance control relay in circuit with the armature of the primary relay, and when de-energized causing one of its members to travel a distance proportionate to the distance of the braking point from the entrance of the dead block, said distance relay automatically opening the circuit of said electro-magnetic braking means when the braking point is reached, a re-energizing circuit for said electro-magnetic device controlled in part by the distance control relay, means for completing said re-energizing circuit when the train movement is wanting in a prescribed degree, and for again de-energizing the said electro-magnetic means when the train again exceeds a prescribed speed in the dead block, a disabling valve for the engineer to prevent him from recharging the train pipe and releasing the brakes, a lock to maintain the disabled condition until the train comes to a stop, and means for then releasing the lock automatically so that the train can proceed at slow speed, substantially as described.

18. In combination in train control apparatus, a primary relay, an electro-magnetic brake controlling device on the engine, a distance control relay in circuit with the armature of the primary relay, and when de-energized causing one of its members to travel a distance proportionate to the distance of the braking point from the entrance of the dead block, said distance relay automatically opening the circuit of said electro-magnetic braking means when the braking point is reached, a re-energizing circuit for said electro-magnetic device controlled in part by the distance relay and completed by a relay which closes its contact below a prescribed slow speed to reenergize said circuit when said slow speed is reached, a disabling valve and lock to prevent the engineer from recharging the train line and releasing the brakes before the train comes to a stop, and means for releasing said lock when the train comes to zero speed, substantially as described.

19. In combination in train control apparatus, a primary relay having a clear contact, a caution signal which is lighted in the caution block, and an advance contact, the latter being closed on reversal of the polarity of the current received by the primary relay in the advance caution block, said relay assuming neutral position when the block is dead, a distance control slow acting relay in circuit with either one or the other of said contacts, an electro-magnetic brake controlling means in a circuit controlled by the distance control relay, said distance control relay having a member adapted to travel a distance proportionate to the travel of the train in reaching the braking point in the dead block.

20. In combination, a primary relay on the engine, an electro-magnetic device on the engine for setting the brakes when de-energized, a distance control relay controlled by said primary relay and including a screw driven from the engine axle, a nut to engage said screw, electric-magnetic means receiving current through the primary relay and an armature controlling the engagement of the nut with the screw, a high speed contact controlled by the said primary relay for deenergizing the electro-magnetic brake controlling device to immediately apply the brakes on entering dead territory at high speed, a distance contact in circuit with the electro-magnetic brake controlling device, said contact being opened by the nut when it reaches the braking point along the screw, a moderate speed contact controlling the circuit through the electro-magnetic brake controlling device, remaining closed at or below a prescribed moderate speed and maintaining said brake controlling device energized until the circuit is opened at the distance contact, and advance caution contacts, one for high speed, and controlling the circuits through the distance control relay magnets and the electro-magnetic brake controlling device under advance caution conditions, substantially as described.

21. In combination in train stop apparatus, a primary relay having a "clear" contact on which the armature of said relay rests when clear conditions exist, and a high speed contact also upon which said armature rests when clear conditions exist, a brake solenoid which is energized through a circuit including said high speed contact, the relay armature and clear contact, when a prescribed high speed of the train exists, a moderate speed relay having a contact opened at high speed and closed below said prescribed high speed, and controlling the circuit through said solenoid, a distance control relay, the magnets of which are in circuit with the clear contact, said distance control relay controlling a contact in the circuit of the solenoid and moderate speed contact, substantially as described.

22. In combination in train stop apparatus, a primary relay having a "clear" contact on which the armature of said relay rests when clear conditions exist, and a high speed contact also upon which said armature rests when clear conditions exist, a brake solenoid which is energized through a circuit including said high speed contact, the relay armature and clear contact, when a prescribed high speed of the train exists, a moderate speed relay having a contact opened at high speed and closed below said prescribed high speed, and controlling the circuit through said solenoid, a distance control relay, the magnets of which are in circuit with the clear contact, said distance control relay controlling a contact in the circuit of the solenoid and moderate speed contact, and advance caution contacts, one being for high speed and upon which the primary relay armature rests when reversed, said contacts controlling the same circuits respectively as the clear and high speed contacts, but under advance caution conditions, substantially as described.

23. In combination in train control apparatus, an engineer's disabling valve, an air release valve organization controlled by a solenoid, a lock for the disabling valve to hold said valve in position with the engineer disabled, a no speed contact which is closed when the train comes to rest, contacts closed by the solenoid when energized, electro-magnetic means for controlling the engineer's disabling valve lock, said electro-magnetic means being energized when said no speed contact is closed and said solenoid controlled contacts are closed so that the release of the disabling valve lock is dependent upon two factors, the resetting of the brake solenoid and the train coming to rest, substantially as described.

24. In combination in train stop apparatus, a primary relay on the vehicle, brake controlling apparatus controlled thereby, means of control for moderate speed and low speed, a tachometer for energizing said means, and means for bringing the train to a stop if the tachometer circuit fails, substantially as described.

25. In combination in train stop apparatus, a brake solenoid, circuit connections in which the solenoid is located, a distance control relay controlling said solenoid circuit, a primary relay controlling the distance control relay, a low speed contact, a moderate speed contact also controlling the solenoid circuit, a tachometer for energizing the magnets of said contacts, a circuit braker in the solenoid circuit, the magnet of which is in the tachometer circuit and which will cause the opening of the solenoid circuit and the application of the brakes, on breakage of the tachometer circuit, substantially as described.

26. In combination in apparatus of the class described, a brake solenoid, a primary relay on the vehicle controlling the same, a moderate speed contact, and a low speed contact also controlling said brake solenoid, a tachometer for energizing separately the magnets of said contacts, a circuit breaker for the solenoid circuit controlled by the tachometer circuit of the moderate speed relay, said circuit breaker opening below a prescribed low speed and said low speed contact closing at said prescribed low speed, but out of time with said circuit breaker, the opening of the solenoid circuit due to the failure of the tachometer deenergizing the solenoid for a primary brake application, followed by the reenergizing of said solenoid by the low speed contact, the distance control relay thereupon opening the solenoid circuit again for a secondary brake application, and means controlled by the distance control relay for reenergizing the brake solenoid, substantially as described.

27. In combination in apparatus of the class described, a brake solenoid, a primary relay and a distance relay on the vehicle controlling the same, a moderate speed contact, and a low speed contact also controlling said brake solenoid, a magnet for each of said contacts, a tachometer for energizing separately the magnets of said contacts, a circuit breaker for the solenoid circuit controlled by the tachometer circuit of the moderate speed magnet, said circuit breaker opening below a prescribed low speed and said low speed contact closing at said prescribed low speed, but out of time with said circuit breaker, the opening of the solenoid circuit due to the failure of the tachometer deenergizing the solenoid for a primary brake application, followed by the reenergizing of said solenoid by the low speed contact, the distance control relay thereupon opening the solenoid circuit again for a secondary brake application, and means controlled by the distance control relay for reenergizing the brake solenoid, an engineer's disabling valve and a lock therefor which are set when a train pipe reduction takes place automatically, to prevent the engineer from recharging the train line, and a no speed contact closing when the speed is zero, for releasing the disabling valve lock, said no speed relay being in the tachometer circuit, substantially as described.

28. In combination in train stop apparatus, a brake solenoid which when deenergized causes application of the brakes, a low speed contact to maintain said brake solenoid energized at a prescribed low speed and opening said circuit if the said speed is exceeded, a distance control relay for opening the solenoid circuit after a prescribed distance has been traversed by the train in dead territory, a primary relay receiving current from the track circuit and controlling the said distance control relay, and a contact controlled by said distance control relay for reenergizing the solenoid circuit, substantially as described.

29. In combination in train stop apparatus, a brake solenoid which when deenergized causes application of the brakes, a low speed contact to maintain said brake solenoid energized at a prescribed low speed and opening said circuit if the said speed is exceeded, a distance control relay for opening the solenoid circuit after a prescribed distance has been traversed by the train on dead territory, a primary relay receiving current from the track circuit and controlling the said distance control relay, and a contact controlled by said distance control relay for reenergizing the solenoid circuit, an engineer's disabling valve with a lock therefor to bring the train to a stop, and a no speed contact for establishing a circuit for releasing the lock so that the engineer can recharge the train line and proceed at said low speed, whereby the train will be brought to a stop at the stop signal but can proceed under restricted speed, substantially as described.

30. In combination with a polarized primary relay on the engine, brake controlling means controlled thereby, a lock for maintaining a safety condition after the brakes are automatically applied, a rail switch, electrical contact means for establishing a normal polarity circuit through the primary relay when the switch is closed, opening said circuit when the switch is open and reversing the polarity of the primary relay circuit during the time that the switch is being closed, and means influenced by the reversal of said circuit and said primary relay to release the lock, so that the train can proceed under conditions otherwise clear, substantially as described.

31. In combination with a polarized primary relay on the engine, brake controlling means controlled thereby, a lock for maintaining a safety condition after the brakes are automatically applied, a rail switch, electrical contact means for establishing a normal polarity circuit through the primary relay when the switch is closed, opening said circuit when the switch is open and reversing the polarity of the primary relay circuit during the time that the switch is being closed, and means influenced by the reversal of said circuit and said primary relay to release the lock, so that the train can proceed under conditions otherwise clear, said primary relay circuit being controlled as to its polarity also by the position of the train ahead, substantially as described.

32. In combination, a brake solenoid which when deenergized causes a brake application, an engineer's disabling valve, a lock for preventing the engineer from restoring the disabling valve, electro-magnetic means for releasing said lock, a circuit for energizing said electro-magnetic means to release the lock, and means for closing said circuit including a contact which closes under a prescribed condition related to the speed of the vehicle, said circuit closing means including also a contact which is closed as a consequence of reenergizing of the solenoid, substantially as described.

33. In combination in a train control apparatus, electro-magntic automatic brake applying means on the vehicle for applying the brakes when deenergized, a primary polarized relay on the vehicle for controlling said brake applying means, speed controlled means on the vehicle also exerting control on said brake applying means and withholding automatic braking in a dead block at a prescribed speed below high speed but causing an automatic brake application above said prescribed speed, locking means for maintaining the withheld condition of the brakes on proceeding into an occupied block at said prescribed low rate of speed, and electro-magnetic means controlled by current from the primary relay when the latter reverses, for releasing the lock, the electro-magnetic brake applying means being then energized through said primary relay, substantially as described.

34. In combination in train control apparatus, electro-magnetic means for causing a brake application when deenergized, mechanism for withholding automatic braking in a dead block at a prescribed low speed, locking means for maintaining said mechanism in said condition upon proceeding into an occupied block at said low speed, an electro-magnet for releasing said lock when energized, and a primary polarized relay for energizing said lock releasing magnet to withdraw the lock when said primary relay receives a current of reverse polarity consequent upon the obstructing vehicle passing into a second block in advance, said primary relay under a normal polarity energization holding the brakes off, and when deenergized causing a brake application, substantially as described.

35. In combination in train control apparatus, an advance caution block energized with a current of reverse polarity, a deenergized caution block, and an occupied block energized with a current of normal polarity, a polarized primary relay on the vehicle energized from the blocks, automatic brake applying means on the vehicle, mechanism for holding the brakes off in the caution block if the speed is kept at a prescribed low rate, and for maintaining said condition upon passing into the occupied block at said low speed, said mechanism including electro-magnetic locking means, said locking means being released by current supplied through the primary relay when this reverses owing to picking up energy of reversed polarity consequent upon the vehicle ahead passing into the second block in advance, substantially as described.

36. In train control mechanism, automatic brake applying means, mechanism for withholding operation of said means in a caution block if the speed is kept at a prescribed low rate, and locking means for maintaining this condition upon passing into an occupied block at said low rate of speed, and signal means in the cab displayed as a result of the locked condition of said mechanism for indicating the presence of the vehicle in the block already occupied, substantially as described.

37. In combination in train control apparatus, automatic brake mechanism, a distance control mechanism driven from the moving vehicle and adapted to defer automatic braking in a caution block at a moderate rate of speed, said distance control mechanism including electro-magnets and an armature for rendering said mechanism effective or ineffective, a polarized primary relay, adapted to assume normal, neutral or reversed position and energizing said electro-magnets in either normal or reversed position, a clear signal which is displayed when said magnets are energized, a danger signal displayed by the dropped armature of said magnets, a lock which holds the armature in dropped position in occupied territory whereby the clear and danger signals will be displayed simultaneously to indicate the presence of the vehicle in the occupied block, said lock being released when the primary relay reverses consequent upon receiving energy of reversed polarity due to the vehicle in advance passing into the second block ahead.

38. In combination in train control apparatus, automatic brake mechanism on the vehicle, a clear signal and a danger signal in the cab, means for withholding automatic braking under danger conditions at a prescribed low rate of speed, and for maintaining this condition upon passing into an occupied block if the speed is kept at the low rate, and means whereby the danger and clear signals are displayed simultaneously at said low speed to indicate the presence of the vehicle in the occupied block, substantially as described.

39. In combination in train control apparatus, a deenergized caution block, an occupied block energized with normal polarity current and an advance caution block energized with current of reversed polarity, cab signals for clear, danger, caution and advance caution, means for withholding automatic braking in a caution block at a prescribed low rate of speed, with locking means for maintaining said condition if the vehicle enters the occupied block at said low speed, a polarized relay on the vehicle energized from the track, and circuit connections controlled by said polarized relay, for releasing said lock when the polarized relay reverses as a consequence of receiving energy of reversed polarity from the advance caution block, the danger and clear signals persisting simultaneously when the vehicle is in the block already occupied, substantially as described.

40. In combination in train control apparatus, automatic brake applying means, mechanism for automatically withholding a brake application in a deenergized caution block at low speed, a locking means for maintaining said mechanism in its brake withholding condition when the vehicle continues into an occupied block at said low speed, a signal which is displayed as a result of withholding the automatic brake application, a primary relay which is energized upon running into an occupied block, and a signal which is displayed as a result of the said energization of the primary relay in the occupied block, said signal persisting simultaneously with the signal first mentioned to indicate that the vehicle is in a block already occupied, substantially as described.

41. In combination in train control apparatus, automatic brake applying means, mechanism for automatically withholding a brake application in a deenergized caution block at low speed, a locking means for maintaining said mechanism in its brake withholding condition when the vehicle continues into an occupied block at said low speed, a signal which is displayed as a result of withholding the automatic brake application, a primary relay which is energized upon running into an occupied block, and a signal which is displayed as a result of the said energization of the primary relay in the occupied block, said signal persisting simultaneously with the signal first mentioned to indicate that the vehicle is in a block already occupied, and means for releasing the lock and for the restoration of said withholding mechanism to normal condition, said means being operated by current through the primary relay when this reverses due to its energization by current of reversed polarity, substantially as described.

42. In combination in train control apparatus, an advance caution block energized with a current of reversed polarity, a deenergized caution block, an occupied block energized with a current of normal polarity, automatic brake applying means, cab signal means for advance caution, caution, danger, clear and occupied block, mechanism for automatically deferring automatic braking in the caution block at moderate speed, a signal displayed during the time that braking is deferred, the danger signal being displayed when said deferred braking takes place in the caution block, means whereby automatic braking is withheld in a caution block at low speed and the last mentioned signal is displayed, locking means for maintaining the brake withholding condition if the vehicle enters the occupied block at low speed, the clear signal being then displayed simultaneously with the danger signal, to indicate the presence of the vehicle in the occupied block, and a polarized primary relay on the vehicle energized from the track and releasing the said lock when energized reversely, substantially as described.

43. In automatic train stop mechanism, an automatic air release valve for releasing train line air, ports for introducing air pressure to the opposite ends of said valve respectively to set it in open and closed position, a valve controlled by a solenoid, said valve controlling equalizing reservoir pressure to the said ports respectively, means for bleeding pressure from the opposite ends of said automatic air release valve, said solenoid controlled valve controlling said pressure bleeding means, said solenoid closing its valve when energized, said valve opening by the air pressure supplied thereto when the solenoid is deenergized.

44. In train control apparatus, a primary relay on the vehicle controlled by the electrical condition of the block, an electro-magnetic device on the vehicle controlled primarily by the primary relay for setting the brakes when de-energized, means for insuring the train coming to a stop when the electro-magnetic device is de-energized, said means including a device for disabling the engineer from recharging the train line and releasing the brakes, and means for re-energizing the said electro-magnetic device when a prescribed condition relative to movement of the train is attained so that the brakes may be released and means for restoring control of the brakes to the engineer automatically when a prescribed condition relative to train movement is reached, substantially as described.

45. In combination in train control apparatus, a primary relay on the vehicle energized from the track system, an electro-magnetic brake controlling device on the engine, a distance control relay in circuit with the primary relay, and when de-energized causing one of its members to travel a distance proportionate to the distance of the braking point from the entrance of a de-energized block, said distance relay automatically opening the circuit of said electro-magnetic braking means when the braking point is reached, means for automatically disabling the engineer from recharging the train line to release the brakes until after train reaches a condition of safety, and for then restoring control of the brakes to the engineer, and means for automatically re-energizing the electro-magnetic device in said de-energized block so that the train can proceed after said condition of safety has been reached, substantially as described.

46. Train-control apparatus according to claim 45 having means for de-energizing said electro-magnetic device for applying the brakes if the train exceeds a prescribed low speed.

In testimony whereof I affix my signature.

PATRICK J. CLIFFORD.